United States Patent
Vissers et al.

(10) Patent No.: US 10,237,009 B2
(45) Date of Patent: *Mar. 19, 2019

(54) DYNAMIC HITLESS RESIZING IN OPTICAL TRANSPORT NETWORKS

(71) Applicant: Huawei Technologies Co., Ltd., Shenzhen (CN)

(72) Inventors: Maarten P. J. Vissers, Amsterdam (NL); Hubertus Adrianus Maria Van Helvoort, Shenzhen (CN); Yang Yang, Shenzhen (CN); Wei Su, Amsterdam (NL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,943

(22) Filed: Dec. 1, 2016

(65) Prior Publication Data

US 2017/0085332 A1    Mar. 23, 2017

Related U.S. Application Data

(63) Continuation of application No. 14/536,268, filed on Nov. 7, 2014, now Pat. No. 9,531,492, which is a
(Continued)

(51) Int. Cl.
    *H04J 14/08*     (2006.01)
    *H04J 1/16*      (2006.01)
(Continued)

(52) U.S. Cl.
    CPC ............ *H04J 3/1658* (2013.01); *H04B 10/27* (2013.01); *H04J 2203/0067* (2013.01); *H04J 2203/0069* (2013.01); *H04J 2203/0082* (2013.01)

(58) Field of Classification Search
    CPC ....... H04J 3/1652; H04J 3/1658; H04J 3/1611
(Continued)

(56) References Cited

U.S. PATENT DOCUMENTS

| | | | |
|---|---|---|---|
| 5,761,619 A | 6/1998 | Danne et al. | |
| 7,012,929 B2 * | 3/2006 | Umayabashi | H04J 3/1694 370/458 |

(Continued)

FOREIGN PATENT DOCUMENTS

| | | |
|---|---|---|
| JP | 2006013562 A | 1/2006 |
| JP | 2009512378 A | 3/2009 |

(Continued)

OTHER PUBLICATIONS

"Series G: Transmission Systems and Media, Digital Systems and Networks; Data over Transport-Generic aspects—General; Series Y: Global Information Infrastructure, Internet Protocol Aspects and Next-Generation Networks; Internet protocol aspects-Transport; Link capacity adjustment scheme (LCAS) for virtual concatenated signals," Telecommunication Standardization Sector for ITU, ITU-T Recommendation G.7042/Y.1305, pp. i-32, International Telecommunications Union, Geneva, Switzerland (Mar. 2006).

(Continued)

*Primary Examiner* — Oommen Jacob
(74) *Attorney, Agent, or Firm* — Leydig, Voit & Mayer, Ltd.

(57) ABSTRACT

The invention relates to techniques for controlling a dynamic hitless resizing in data transport networks. According to a method aspect of the invention, a network connection comprises M tributary slots defined in a payload area of a higher order transport scheme of the data transport network and the method comprises the steps of receiving a connection resize control signal at each of the nodes along the path of the network connection; adding at each node along the path in response to the connection resize control signal a second set of N tributary slots to the first set of the M tributary slots, such that the network connection comprises M+N tributary slots; and increasing, after M+N tributary slots are available for the network connection at each node along the path, a transport data rate of the network connection.

13 Claims, 39 Drawing Sheets

Related U.S. Application Data continuation of application No. 13/424,229, filed on Mar. 19, 2012, now Pat. No. 8,886,040, which is a continuation of application No. PCT/CN2009/074015, filed on Sep. 17, 2009.

(51) Int. Cl.
  *H04J 3/14* (2006.01)
  *H04J 3/16* (2006.01)
  *H04B 10/27* (2013.01)

(58) Field of Classification Search
  USPC .................................. 398/58, 43; 370/477
  See application file for complete search history.

(56) References Cited

U.S. PATENT DOCUMENTS

| | | | | |
|---|---|---|---|---|
| 7,170,851 | B1* | 1/2007 | Chen | H04J 3/14 370/222 |
| 8,249,108 | B2* | 8/2012 | Katagiri | H04J 3/07 370/474 |
| 8,374,186 | B2* | 2/2013 | Dong | H04J 3/1652 370/395.51 |
| 8,886,040 | B2* | 11/2014 | Vissers | H04J 3/1658 370/470 |
| 9,531,492 | B2* | 12/2016 | Vissers | H04J 3/1658 |
| 2002/0024971 | A1* | 2/2002 | Umayabashi | H04J 3/1694 370/468 |
| 2002/0027929 | A1* | 3/2002 | Eaves | H04J 3/07 370/505 |
| 2003/0123472 | A1* | 7/2003 | Dufour | H04J 3/1617 370/442 |
| 2005/0281197 | A1* | 12/2005 | Honda | H04L 12/4641 370/235 |
| 2006/0018324 | A1 | 1/2006 | Nisar et al. | |
| 2006/0104309 | A1* | 5/2006 | Vissers | H04J 3/1658 370/474 |
| 2006/0140225 | A1 | 6/2006 | Christensen et al. | |
| 2006/0168330 | A1 | 7/2006 | Gerdstrom | |
| 2006/0187715 | A1* | 8/2006 | Narvaez | H04J 3/062 365/185.24 |
| 2006/0291391 | A1* | 12/2006 | Vasseur | H04L 45/02 370/235 |
| 2008/0259795 | A1* | 10/2008 | Fiaschi | H04J 3/1611 370/232 |
| 2010/0067547 | A1* | 3/2010 | Katagiri | H04J 3/07 370/474 |
| 2010/0080245 | A1* | 4/2010 | Kisaka | H04J 3/07 370/470 |
| 2010/0142947 | A1* | 6/2010 | Shin | H04J 3/1652 398/43 |
| 2011/0286744 | A1* | 11/2011 | Shin | H04J 3/1652 398/45 |
| 2012/0002965 | A1* | 1/2012 | Bellato | H04J 3/1652 398/52 |
| 2012/0039609 | A1* | 2/2012 | Dong | H04J 3/1652 398/66 |
| 2012/0082455 | A1* | 4/2012 | Bardalai | H04J 3/1652 398/58 |
| 2012/0148240 | A1* | 6/2012 | Ceccarelli | H04L 45/50 398/45 |
| 2012/0163812 | A1* | 6/2012 | Youn | H04J 3/1658 398/45 |
| 2012/0170936 | A1* | 7/2012 | Vissers | H04J 3/1658 398/58 |
| 2012/0224857 | A1* | 9/2012 | Su | H04J 3/1652 398/98 |
| 2015/0063806 | A1* | 3/2015 | Vissers | H04J 3/1658 398/58 |

FOREIGN PATENT DOCUMENTS

| | | |
|---|---|---|
| RU | 2158490 C2 | 10/2000 |
| RU | 2292646 C2 | 1/2007 |
| WO | 9629834 A1 | 9/1996 |
| WO | 9728505 A1 | 8/1997 |
| WO | 02099574 A2 | 12/2002 |
| WO | 2004006503 A1 | 1/2004 |
| WO | 2005077119 A2 | 8/2005 |

OTHER PUBLICATIONS

"Series G: Transmission Systems and Media, Digital Systems and Networks; Digital terminal equipments—General; Series Y: Global Information Infrastructure, Internet Protocol Aspects and Next Generation Networks; Internet protocol aspects—Transport; Interfaces for the Optical Transport Network (OTN)," Telecommunication Standardization Sector for ITU, ITU-T Recommendation G.709/Y.1331, pp. 2-16, International Telecommunications Union, Geneva, Switzerland (Mar. 2003).

"Series G: Transmission Systems and Media, Digital Systems and Networks; Digital terminal equipments—General; Series Y: Global Information Infrastructure, Internet Protocol Aspects and Next-Generation Networks; Internet protocol aspects—Transport; Interfaces for the Optical Transport Network (OTN); Amendment 3: 100 Gbit/s support, one-stage multiplexing and other improvements," Telecommunication Standardization Sector for ITU, ITU-T Recommendation G.709/Y.1331, pp. i-68, International Telecommunications Union, Geneva, Switzerland (Apr. 2009).

* cited by examiner

|     | Column 15 | | | | | | | |
| --- | --- | --- | --- | --- | --- | --- | --- | --- |
| Row | 1 | 2 | 3 | 4 | 5 | 6 | 7 | 8 |
| 1 | TSGS | TPID | | | | | | |
| 2 | CTRL | TSCC | NCS | RES | RES | RES | RES | RES |
| 3 | CRC-8 | | | | | | | |

Fig. 12

DYNAMIC HITLESS RESIZING IN OPTICAL TRANSPORT NETWORKS

CROSS-REFERENCE TO RELATED APPLICATIONS

This application is a continuation application of U.S. patent application Ser. No. 14/536,268, filed on Nov. 7, 2014, which is a continuation of U.S. patent application Ser. No. 13/424,229, filed on Mar. 19, 2012, now U.S. Pat. No. 8,886,040, which is a continuation of International Application No. PCT/CN2009/074015, filed on Sep. 17, 2009. The afore-mentioned patent applications are hereby incorporated by reference in their entireties.

TECHNICAL FIELD

The invention relates to techniques for controlling a dynamic hitless resizing in data transport networks. More specifically, the invention relates to hitless resizing in optical transport networks.

TECHNICAL BACKGROUND

In a telecommunications environment, data transport networks such as Plesiochronous Digital Hierarchy (PDH) networks, Synchronous Digital Hierarchy (SDH) networks or Synchronous Optical NETworks (SONET) are used for transporting data streams from 2 Mbit/s up to 10 Gbit/s, not only for voice, but also for packet data. Such transport networks may form a backbone for interconnecting network nodes in a communications network or between communication networks. The Optical Transport Networks (OTN) may be employed as data transport networks for the higher data rates of 1 Gbit/s up to 100 Gbit/s, which can be achieved based on optical transmission technologies.

The International Telecommunication Union (ITU) Telecommunication Standardization Sector (ITU-T) provides recommendation G.709 as the standardization reference for optical data transport networks and interfaces. The G.709 standard specifies the optical transport hierarchy and the interfaces for optical networks of various kinds of network architectures.

The data to be transported for a particular client service will be inserted into transport frames of a suitable hierarchical level depending on the required data rate (bandwidth). However, in general the bandwidth required for a particular client service will not exactly fit to the bandwidth provided for by a particular hierarchical level, i.e. the efficiency of bandwidth usage will be low. In order to provide more efficient use of the available bandwidth, concepts have been developed according to which the client service data are to be inserted into several identical transport frames of a lower hierarchical level. In order to be able to recover the data at the end, the association of the multiple transport frames with each other has to be represented in the data transport network. The related concepts are commonly referred to as "Virtual concatenation" (VCAT) initially developed for SDH, see for an introduction G.709, section 18.

The approach for providing flexible bandwidth connections through an OTN is "ODUflex", see G.709 and 3, rev 2. ODUflex supports the transport of circuit-based (CBR, Constant Bit Rate) clients as well as packet-based (GFP, Generic Framing Procedure) clients. The bandwidth of the network ODU (Optical Data Unit) connection can be adjusted according to the bandwidth needs of the client service.

A general problem for any existing connection passing through the data transport network is dynamic resizing, in particular in the case of transporting packet based data. The client service may have a dynamic bandwidth requirement, i.e. the bandwidth requirement varies with time. The serving network connection should be flexibly configured accordingly in a hitless manner, i.e. there should be no packet loss when resizing the connection.

The hitless issue cannot be achieved when considering a very simple solution for resizing, namely terminating, in a first step, an existing connection and initiating, in a subsequent step, a new one (with a different bandwidth). At the time when the first connection is already terminated, but the second connection is not yet active, there will presumably packets be lost for the client service. Invoking the second connection before terminating the first leeds to a blocking, i.e. waste, of transport resources. Thus, more sophisticated concepts are required for hitless resizing.

In the (SDH) VCAT framework, a concept termed "Link Capacity Adjustment Scheme" (LCAS) has been developed, see G.7402 and for its application in OTN G.709, section 18.3. Using LCAS, the bandwidth of a "connection" represented by multiple virtually concatenated containers (ODUk) can be increased or decreased by adding or removing elements of the Virtual Concatenation Group (VCG).

While the VCAT/LCAS approach provides for flexible bandwidth connections which can be dynamically resized on demand, this comes on the cost of high complexity. For example, the multiple members of the VCG may be transmitted along different paths in the network. Thus, delay compensating buffers are required at the sink (egress) end point of the virtual connection. Further, the LCAS protocol is relatively complex, as, for example, the status of each member has to be sent back from the sink end point to the source (ingress) end point of the virtual connection.

SUMMARY

There is a demand for a technique for resizing a network connection in a data transport network, which enables hitless resizing with less complexity.

This demand is satisfied by a first method for controlling dynamic hitless resizing of a network connection in a data transport network. All the method aspects and node aspects outlined in this section are based on that a path of the network connection extends between two connection end nodes and optionally over one or more intermediate nodes of the data transport network. The network connection transports data of client services in transport frames from the ingress end node to the egress end node. The network connection comprises a first set of M tributary slots defined in a payload area of a higher order transport scheme of the data transport network.

The first method comprises, in case the network connection is to be incremented, the steps of receiving a connection resize control signal at each of the nodes along the path of the network connection; adding at each node along the path in response to the connection resize control signal a second set of N tributary slots to the first set of the M tributary slots (after increasing, M+N tributary slots are available for the network connection at each node along the path); and increasing, after M+N tributary slots are available for the network connection at each node along the path in a synchronized manner between each pair of neighbouring nodes, a transport data rate of the network connection. In case the network connection is to be decremented, the first method comprises the steps of receiving a connection resize control signal at each of the nodes along the path of the network connection; decreasing, after a second set of N tributary slots has been prepared for removal at each node along the path of the network connection in a synchronized manner between each pair of neighbouring nodes, a transport data rate of the network connection; and removing at each node along the path in response to the connection resize control signal a second set of N tributary slots from the first set of the M tributary slots (thus, after decreasing, M−N tributary slots are available for the network connection at each node along the path).

The data transport network may comprise an optical transport network. In one variant, the network connection is an Optical Channel Data Unit "ODU" connection with selectable bandwidth. Specifically, the network connection may be an ODUflex connection.

In one implementation, the network connection comprises a set of link connections between each pair of neighbouring nodes along the path, and comprises matrix through-connections in each intermediate node in the path, a matrix internally interconnecting multiple link connections of the intermediate node with other nodes in the data transport network, link connections and matrix through-connections being defined based on the tributary slots. Each node along the path of the network connection comprises at least one collection/distribution point for either collecting the client data from a set of link connections and distributing the client data to a set of matrix through-connections or for collecting the client data from a set of matrix through-connections and distributing the client data to a set of link connections. In case the network connection is to be incremented, the step of adding the N tributary slots comprises, at the collection/distribution point, adding the N tributary slots to the M link connections, and adding the N tributary slots to the M matrix through-connections. In case the network connection is to be decremented, the step of removing the N tributary slots comprises, at the collection/distribution point, removing the N tributary slots from the M link connections, and removing the N tributary slots from the M matrix through-connections.

According to one implementation, the method may comprise the further steps of sending, by the ingress end node, a data rate control signal hop-by-hop along the path of the network connection, wherein the data rate control signal is discarded by a node which has not finished the step of adding or making for removal, respectively, the N tributary slots; sending, by the egress end node in response to a reception of the data rate control signal, an acknowledgement to the ingress end node; and increasing, in case the network connection is to be incremented, by the ingress end node in response to the reception of the acknowledgement the data rate of the signal passing through the network connection; or in case the network connection is to be decremented, decreasing the data rate of the signal passing through the network connection and then removing the N tributary slots from the M tributary slots at each node along the path.

Thus, the data rate control signal and the acknowledgement thereof represent a form of handshaking procedure between the end nodes.

The data rate signal may comprise N TS signals, each TS signal being sent separately hop-by-hop along the path and being acknowledged separately by the egress end node.

In one realization of the method, the step of adding or removing, respectively, the second set of N tributary slots to or from the first set of the M tributary slots in an intermediate node comprises adding or removing, respectively, the N tributary slots to or from the M tributary slots with respect to at least a link connection, the link connection connecting the intermediate node with another node along the path of the network connection, and a matrix through-connection, the matrix internally interconnecting multiple link connections of the intermediate node with other nodes in the data transport network; and re-grouping, in case M tributary slots are assigned to the link connection and M+N tributary slots are assigned to the matrix through-connection, or in case M+N tributary slots are assigned to the link connection and M tributary slots are assigned to the matrix through-connection, the data to be transported over the network connection from M data groups into M+N data groups or from M+N data groups into M data groups, or, alternatively, re-grouping, in case M tributary slots are assigned to the link connection and M−N tributary slots are assigned to the matrix through-connection, or in case M−N tributary slots are assigned to the link connection and M tributary slots are assigned to the matrix through-connection, the data to be transported over the network connection from M data groups into M−N data groups or from M−N data groups into M data groups.

According to a one implementation, the step of adding the N tributary slots to the M tributary slots in a node may comprise decreasing a number of data units per transport frame for the M tributary slots by a factor of M/(M+N), or alternatively the step of removing the N tributary slots from the M tributary slots in the node comprises increasing a number of data units per transport frame for the M tributary slots by a factor of M/(M−N).

In this implementation, a number of data units per transport frame for the N tributary slots may be kept unchanged. In the step of increasing or decreasing, respectively, the transport data rate of the network connection, a number of data units per transport frame may be increased or decreased, respectively, collectively for the M tributary slots and the N tributary slots.

The connection resize control signal may be sent by network management, and may be sent in arbitrary order to each of the nodes along the path of the network connection. The step of adding or removing, respectively, the N tributary slots to or from the M tributary slots may be performed in each of the nodes along the network connection path independently.

One realization of the method comprises, for the case that the N tributary slots are to be added to the M tributary slots, the previous steps of checking an availability of N tributary slots in each of the nodes along the path of the network connection; and allocating available N tributary slots in the nodes along the path for the network connection.

At least one of the connection resize control signal and the data rate control signal may be transported in an overhead portion of at least one of the second set of the N tributary slots. The at least one of the second set of the N tributary slots may have been allocated in the allocating step but may be unused prior to the step of increasing the transport data rate of the network connection. Alternatively, the slot is to be unallocated in a subsequent de-allocation step in case the network connection has to be decremented, and is therefore already unused.

The above-mentioned demand is further satisfied by a second method for controlling dynamic hitless resizing of a network connection in a data transport network. The method is performed in the ingress end node. For the case the network connection is to be incremented, the second method comprises the steps of receiving a connection resize control signal; adding a second set of N tributary slots to the first set of the M tributary slots (after increasing, M+N tributary slots are available for the network connection at each node along the path); and increasing, after M+N tributary slots are available for the network connection at each node along the path in a manner synchronized with the downstream node, a transport data rate of the network connection. In case the network connection is to be decremented, the second method comprises the steps of receiving (314) a connection resize control signal; decreasing, after a second set of N tributary slots has been prepared for removal in a synchronized manner between the ingress end node and the neighbouring node, a transport data rate of the network connection; and removing a second set of N tributary slots from the first set of the M tributary slots (after decreasing, M−N tributary slots are available for the network connection at each node along the path).

One implementation of the second method comprises the further steps of initiating a sending of a data rate control signal hop-by-hop along the path of the network connection, wherein the data rate control signal is discarded by a node which has not finished the step of adding or marking for removal, respectively, the N tributary slots; and receiving an acknowledgement to the data rate control signal from the egress end node; and increasing, in case the network connection is to be incremented, in response to the reception of the acknowledgement the data rate of the signal passing through the network connection; or, in case the network connection is to be decremented, decreasing the data rate of the signal passing through the network connection and then removing the N tributary slots from the M tributary slots at each node along the path.

The above-mentioned demand is still further satisfied by a third method for controlling dynamic hitless resizing of a network connection in a data transport network. The method is performed in an intermediate node and comprises the steps of receiving a connection resize control signal; adding or removing, respectively, in response to the connection resize control signal a second set of N tributary slots to or from the first set of the M tributary slots, such that the network connection comprises M+N tributary slots or M−N tributary slots, respectively.

In one implementation, the network connection comprises a set of link connections between each pair of neighbouring nodes along the path, and comprises matrix through-connections in each intermediate node in the path, a matrix internally interconnecting multiple link connections of the intermediate node with other nodes in the data transport network, link connections and matrix through-connections being defined based on the tributary slots. The intermediate node comprises a first collection/distribution point for collecting the client data from a set of link connections terminating from the upstream node and distributing the client data to a set of matrix through-connections and a second collection/distribution point for collecting the client data from a set of matrix through-connections and distributing the client data to a set of link connections starting towards a downstream node. In case the network connection is to be incremented, the step of adding the N tributary slots comprises, at each of the collection/distribution point, adding the N tributary slots to the M link connections, and adding the N tributary slots to the M matrix through-connections. In case the network connection is to be decremented, the step of removing the N tributary slots comprises, at each of the collection/distribution points, removing the N tributary slots from the M link connections, and removing the N tributary slots from the M matrix through-connections.

According to one variant, the third method comprises the further steps of receiving a data rate control signal from a node upstream or downstream the network connection path; and discarding the data rate control signal in case the step of adding or marking for removal, respectively, the N tributary slots is not finished, or alternatively forwarding the data rate control signal to the next node along the network connection path.

In one implementation of the third method, the step of adding or removing, respectively, the N tributary slots to or from the M tributary slots comprises adding or removing, respectively, the N tributary slots to or from the M tributary slots with respect to either a link connection, the link connection connecting the intermediate node with another node along the path of the network connection, or a matrix through-connection, the matrix internally interconnecting multiple link connections of the intermediate node with other nodes in the data transport network; and re-grouping, in case M tributary slots are assigned to the link connection and M+N tributary slots are assigned to the matrix through-connection, or in case M+N tributary slots are assigned to the link connection and M tributary slots are assigned to the matrix through-connection, the data to be transported over the network connection from M data groups into M+N data groups or from M+N data groups into M data groups, or, alternatively, re-grouping, in case M tributary slots are assigned to the link and M−N tributary slots are assigned to the matrix through-connection, or in case M−N tributary slots are assigned to the link connection and M tributary slots are assigned to the matrix through-connection, the data to be transported over the network connection from M data groups into M−N data groups or from M−N data groups into M data groups.

The above-mentioned demand is also satisfied by a fourth method for controlling dynamic hitless resizing of a network connection in a data transport network. The method is performed in the egress end node and comprises the steps of receiving a connection resize control signal; adding or removing, respectively, in response to the connection resize control signal a second set of N tributary slots to or from the first set of the M tributary slots; such that the network connection comprises M+N tributary slots or M−N tributary slots, respectively; receiving a data rate control signal from the node upstream the network connection path; and sending, in response to a reception of the data rate control signal, an acknowledgement to the ingress end node.

Further, the abovementioned demand is satisfied by a computer program product, which comprises program code portions for performing the steps of one or more of the methods and method aspects described herein when the computer program product is executed on one or more computing devices, for example an ingress end node, intermediate node, or egress end node of a network connection in a data transport network. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

Further, the above-mentioned demand is satisfied by a network node adapted for controlling dynamic hitless resizing of a network connection in a data transport network. The network node implements the ingress end node and comprises a component adapted to receive a connection resize control signal; a component adapted to add a second set of N tributary slots to the first set of the M tributary slots; a component adapted to increase, after M+N tributary slots are available for the network connection at each node along the path in a synchronized manner between each pair of neighbouring nodes, a transport data rate of the network connection; a component adapted to decrease a transport data rate of the network connection, after a second set of N tributary slots has been prepared for removal at each node along the path of the network connection in a synchronized manner between each pair of neighbouring nodes; and a component adapted to remove a second set of N tributary slots from the first set of the M tributary slots.

The network node may further comprise a component adapted to initiate a sending of a data rate control signal hop-by-hop along the path of the network connection, wherein the data rate control signal is discarded by a node which has not finished the step of adding or marking for removal, respectively, the N tributary slots; a component adapted to receive an acknowledgement to the data rate control signal from the egress end node; a component adapted to increase, in response to the reception of the acknowledgement, the data rate of the signal passing through the network connection, and a component adapted to decrease, in case the network connection is to be decremented, the data rate of the signal passing through the network connection and a component adapted to then remove the N tributary slots from the M tributary slots at each node along the path.

The above-mentioned demand is further satisfied by a network node adapted for controlling dynamic hitless resizing of a network connection in a data transport network, wherein the network node implements an intermediate node. The network node comprises a component adapted to receive a connection resize control signal; a component adapted to add or remove, respectively, in response to the connection resize control signal a second set of N tributary slots to or from the first set of the M tributary slots, such that the network connection comprises M+N tributary slots or M−N tributary slots, respectively; and a component adapted to forward the connection resize control signal to the next node along the network connection path.

According to one implementation, the network connection comprises a set of link connections between each pair of neighbouring nodes along the path, and comprises matrix through-connections in each intermediate node in the path, a matrix internally interconnecting multiple link connections of the intermediate node with other nodes in the data transport network, link connections and matrix through-connections being defined based on the tributary slots. The intermediate node comprises a first collection/distribution point for collecting the client data from a set of link connections terminating from the upstream node and distributing the client data to a set of matrix through-connections and a second collection/distribution point for collecting the client data from the set of matrix through-connections and distributing the client data to a set of link connections starting towards a downstream node. Each of the collection/distribution points is adapted to, in case the network connection is to be incremented, add the N tributary slots by adding the N tributary slots to the M link connections, and adding the N tributary slots to the M matrix through-connections. Each of the collection/distribution points is adapted to, in case the network connection is to be decremented, remove the N tributary slots by removing the N tributary slots from the M link connections, and removing the N tributary slots from the M matrix through-connections.

In one variant, the network node further comprises a component adapted to receive a data rate control signal from a node upstream or downstream the network connection path; and a component adapted to discard the data rate control signal in case the step of adding or marking for removal, respectively, the N tributary slots is not finished, and a component adapted to forward the data rate control signal to the next node along the network connection path.

According to one implementation of the network node, the component adapted to add or remove, respectively, the N tributary slots to or from the M tributary slots comprises a sub-component adapted to add or remove, respectively, the N tributary slots to or from the M tributary slots with respect to either a link connection, the link connection connecting the intermediate node with another node along the path of the network connection, or a matrix through-connection, the matrix internally interconnecting multiple link connections of the intermediate node with other nodes in the data transport network; and a sub-component adapted to re-group, in case M tributary slots are assigned to the link connection and M+N tributary slots are assigned to the matrix through-connection, or in case M+N tributary slots are assigned to the link connection and M tributary slots are assigned to the matrix through-connection, the data to be transported over the network connection from M data groups into M+N data groups or from M+N data groups into M data groups, or, additionally or alternatively, being adapted to re-group, in case M tributary slots are assigned to the link connection and M−N tributary slots are assigned to the matrix through-connection, or in case M−N tributary slots are assigned to the link connection and M tributary slots are assigned to the matrix through-connection, the data to be transported over the network connection from M data groups into M−N data groups or from M−N data groups into M data groups.

The above-mentioned demand is still further satisfied by a network node adapted for controlling dynamic hitless resizing of a network connection in a data transport network, wherein the network node implements the egress end node and comprises a component adapted to receive a connection resize control signal; a component adapted to add or remove, respectively, in response to the connection resize control signal a second set of N tributary slots to or from the first set of the M tributary slots, such that the network connection comprises M+N tributary slots or M−N tributary slots, respectively; a component adapted to receive a data rate control signal from the node upstream the network connection path; and a component adapted to send, in response to a reception of the data rate control signal, an acknowledgement to the ingress end node.

The above-mentioned demand is eventually satisfied by a data transport network comprising one or more of the network nodes as outlined above.

BRIEF DESCRIPTION OF THE DRAWINGS

In the following, the invention will further be described with reference to exemplary embodiments illustrated in the figures, in which:

FIG. 1b illustrates more details of the ODUflex connection extending over the network of FIG. 1a;

FIG. 2 schematically illustrates functional blocks of the ingress end node illustrated in FIG. 1a;

FIG. 4 schematically illustrates functional blocks of an embodiment of one of the intermediate nodes illustrated in FIG. 1a;

FIG. 5b illustrates in more detail one of the steps of the flow diagram of FIG. 5a;

FIG. 6 schematically illustrates functional blocks of an embodiment of the egress end node illustrated in FIG. 1a;

FIG. 7 is a flow diagram illustrating an operation of the egress end node of FIG. 1a;

FIG. 8 illustrates an overall operation for incrementing the network connection of the network of FIG. 1a;

FIG. 9 illustrates an overall operation for decrementing the network connection of the network of FIG. 1a;

FIG. 10 is a flow diagram illustrating an overall operation for incrementing the network connection of the network of FIG. 1a;

FIG. 11 is a flow diagram illustrating an overall operation for decrementing the network connection of the network of FIG. 1a;

FIG. 12 schematically illustrates a signaling format for controlling a hitless resizing;

FIGS. 13a-13l schematically illustrate step-by-step a process of increasing the network connection in the network of FIG. 1a; and FIGS. 14a-14m schematically illustrate step-by-step a process of decreasing the network connection in the network of FIG. 1a.

DETAILED DESCRIPTION

Figure 1A:
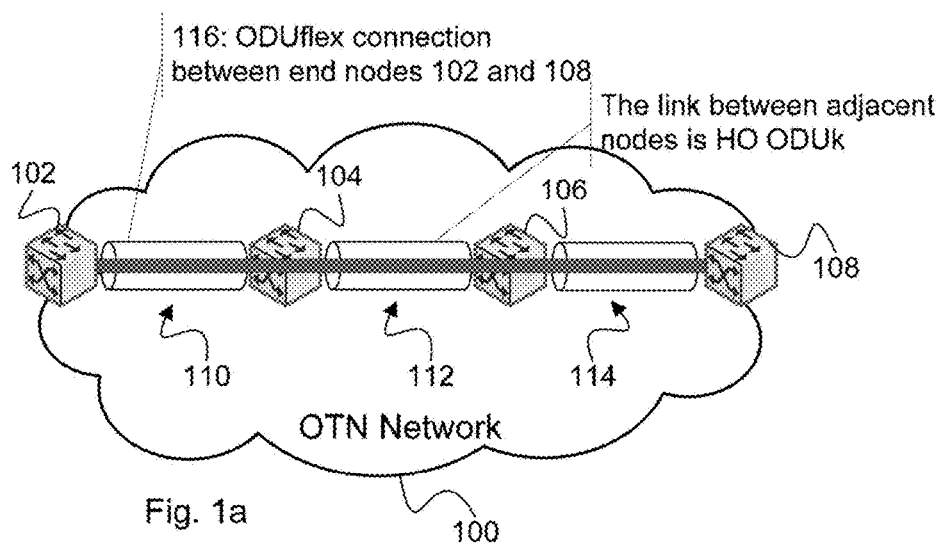
FIG. 1a schematically illustrates an embodiment of an optical transport network.

In the following description, for purposes of explanation and not limitation, specific examples of network scenarios, network nodes and operations thereof will be set forth in order to provide a thorough understanding of the current invention. It will be apparent to one of skill in the art that the current invention may be practiced in embodiments that depart from these specific aspects.

Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to the processor, wherein the memory is encoded with one or more programs that perform the methods disclosed herein when executed by the processor.

FIG. 1 illustrates an embodiment of an optical transport network 100 which comprises network nodes 102, 104, 106 and 108. Between particular pairs of nodes, specific data transmission capacities are available, as indicated schematically for the pair of nodes 102 and 104 by link 110, for the pair of nodes 104 and 106 by link 112, and for the pair of nodes 106 and 108 by link 114. An ODUflex connection 116 extends over network 100. With respect to the ODUflex connection 116, node 102 is the ingress (source) end node, nodes 104 and 106 are intermediate nodes, and node 108 is the egress (sink) end node.

Figure 1B:
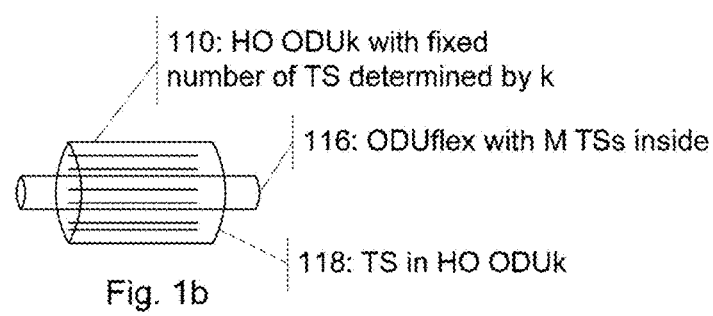

FIG. 1b illustrates in more detail the ODUflex connection 116 as represented, for example, in the link 110. The link 110 comprises a HO ODUk (Higher Order Optical Data Unit level k) with a fixed number of tributary slots (TS) 118, the number thereof being determined by the level k. The ODUflex network connection 116 comprises M of the tributary slots 118, M being a natural number. The links 112 and 114 may show a similar structure.

Figure 2:
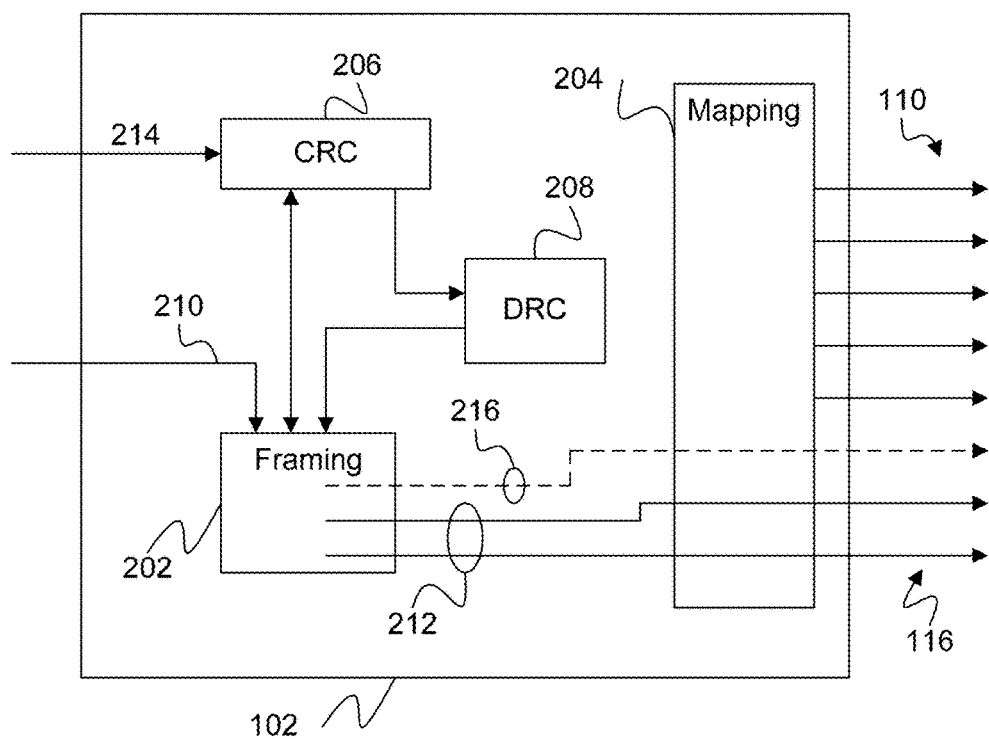

FIG. 2 schematically illustrates functional building blocks of an embodiment of the ingress end node 102 of FIG. 1a. The node 102 comprises a framing component 202, a mapping component 204, a Connection Resize Control (CRC) component 206 and a Data Rate Control (DRC) component 208. The framing component 202 is adapted to insert client data 210 (e.g., Ethernet, MPLS, or IP) into the M tributary slots (TS) 212 configured to form the ODUflex connection 116. For example, the client data packets are encapsulated in an OPUflex payload area. The Mapping component 204 acts to manage the ODUflex connection 116 in the ingress end node 102.

Figure 3A:
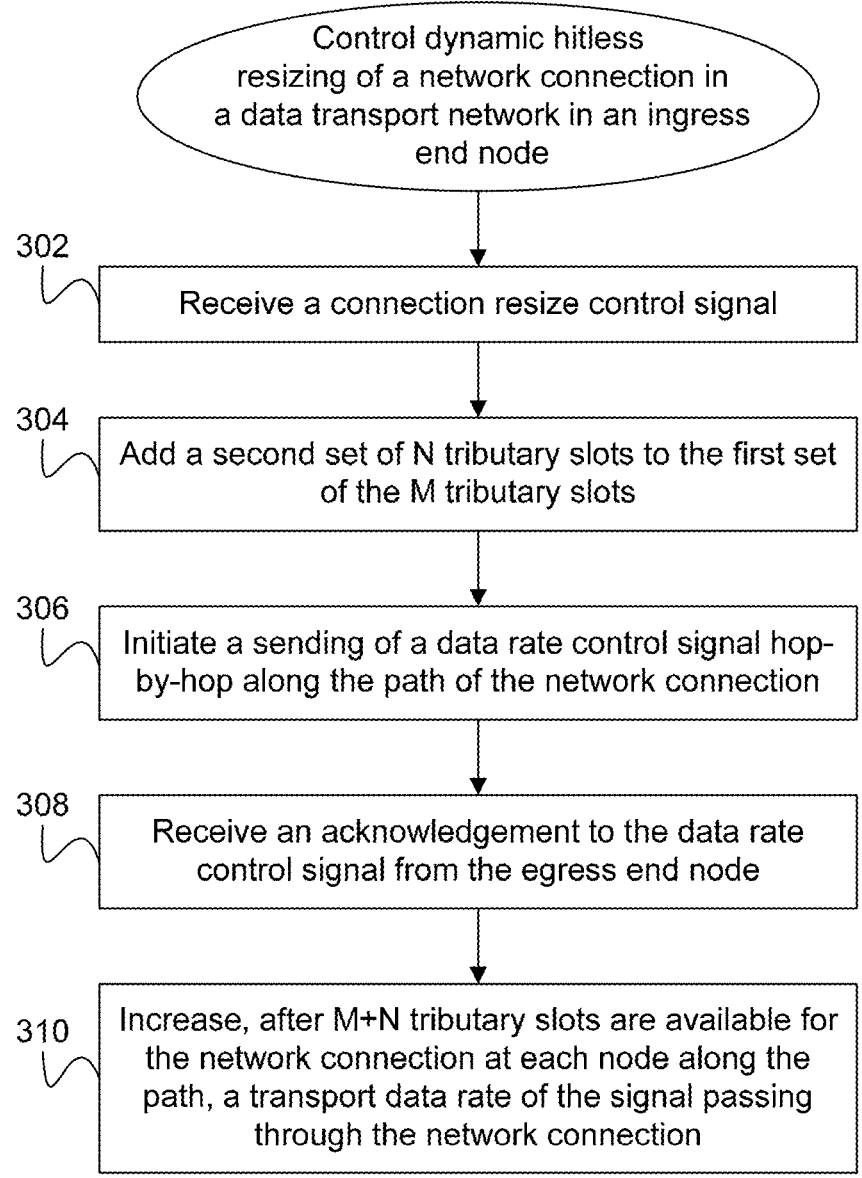
FIG. 3a is a flow diagram illustrating a first operational mode of the ingress end node of FIG. 2.

The node 102 is also adapted to control a dynamic hitless resizing of the ODU connection 116. Corresponding operations of node 102 will be described with respect to the flow diagrams illustrated in FIGS. 3a and 3b. Referring first to FIG. 3a, in step 302, the CRC component 206 is operative to receive a connection resize control signal, which may be sent from a network management entity. The connection resize control (CRC) signal indicates to the node the resizing of the ODUflex connection 116. For example, one connection resize control signal may be sent containing data for all TSs to be added to the connection 116, and such control signal may indicate a port number of each slot.

The CRC component 206 may receive the CRC signal 214. The CRC component 206 controls the further components of the node 102 accordingly, as will be described below.

In step 304, the mapping component 204 adds a second set of N tributary slots 216 to the first set of the M tributary slots 212. The CRC component 206 may instruct the mapping component 204 to reconfigure the N tributary slots 216 according to the information received in the signaling 214.

In step 306, the DRC component 208 is triggered by the CRC component 206 to generate a Data Rate Control (DRC) signal (one DRC signal for each of the N slots to be added). The DRC signal is discarded by any node along the path of the ODUflex connection 116 which has not yet finished the step of adding or marking for removal, respectively, the particular slot of the N tributary slots. In other words, in case the DRC signal is conveyed hop-by-hop along the path of connection 116, the DRC signal will only arrive at the egress end node 108 after the ingress end node 102 and all intermediate nodes 104, 106 have successfully resized the ODUflex connection by adding or removing the particular of the N slots to or from the M slots. The DRC component 208 provides the DRC signal to the framing component 202 and initiates thereby the sending of the DRC signal hop-by-hop along the path of the network connection 116, as the DRC signal may be conveyed in the overhead of transport frames (more details will be given below).

In step 308, from the egress end node 108 an acknowledgement to the DRC signal of step 306 is received in node 102 (not explicitly shown in FIG. 2). In response thereto, in step 310 the transport data rate of the signal passing through the ODUflex connection 116 is increased by suitable operation of at least one the framing component 202 and mapping component 204. For example, in case of incrementing the ODUflex connection 116, after M+N tributary slots are available for the connection 116 at each node along the path, the transport data rate is increased. Alternatively, in case the ODUflex connection 116 has to be decremented, the data rate of the signal passing through the network connection 116 is decremented. Then the N tributary slots are removed from the M tributary slots.

The step of preparing the N slots for either addition or removal in each node has to be synchronized with the neighouring node on the other end of the link connection in order to ensure that it is the same tributary slot or set of tributary slots which is removed on both ends of the link connection.

Figure 3B:
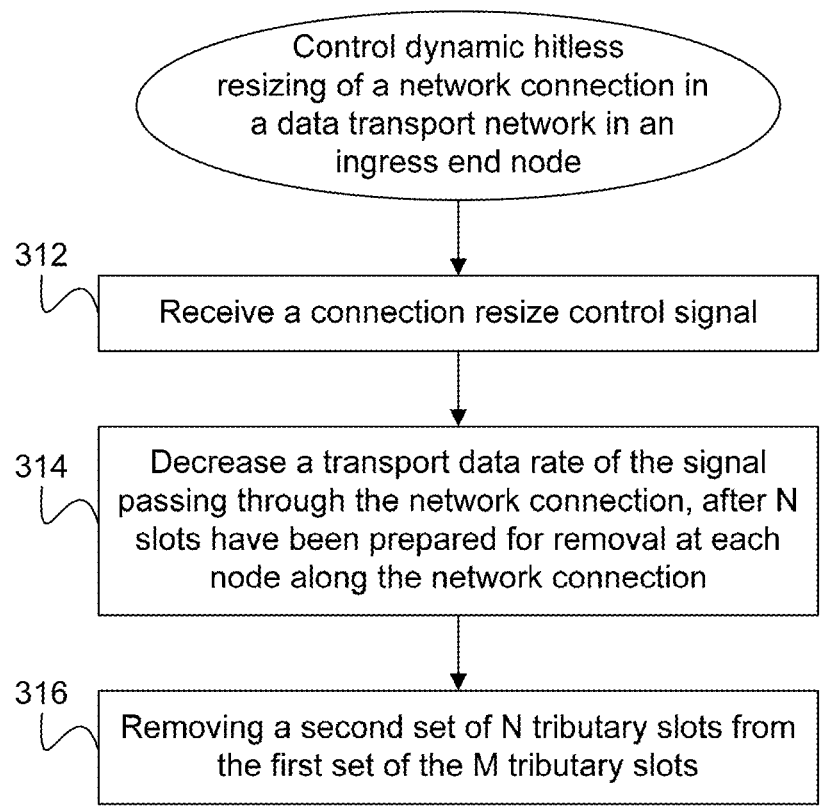
FIG. 3b is a flow diagram illustrating a second operational mode of the ingress end node of FIG. 2.

FIG. 3b illustrates, in a similar manner as FIG. 3a, a procedure of controlling a decrementing of a network connection. In step 312, the CRC component 206 receives a CRC signal from network management. In step 314, the framing component 202 and/or mapping component 204 is operative to decrease a transport data rate of the network connection 116. In step 316, the mapping component 204 removes N tributary slots from the M tributary slots.

Figure 4:
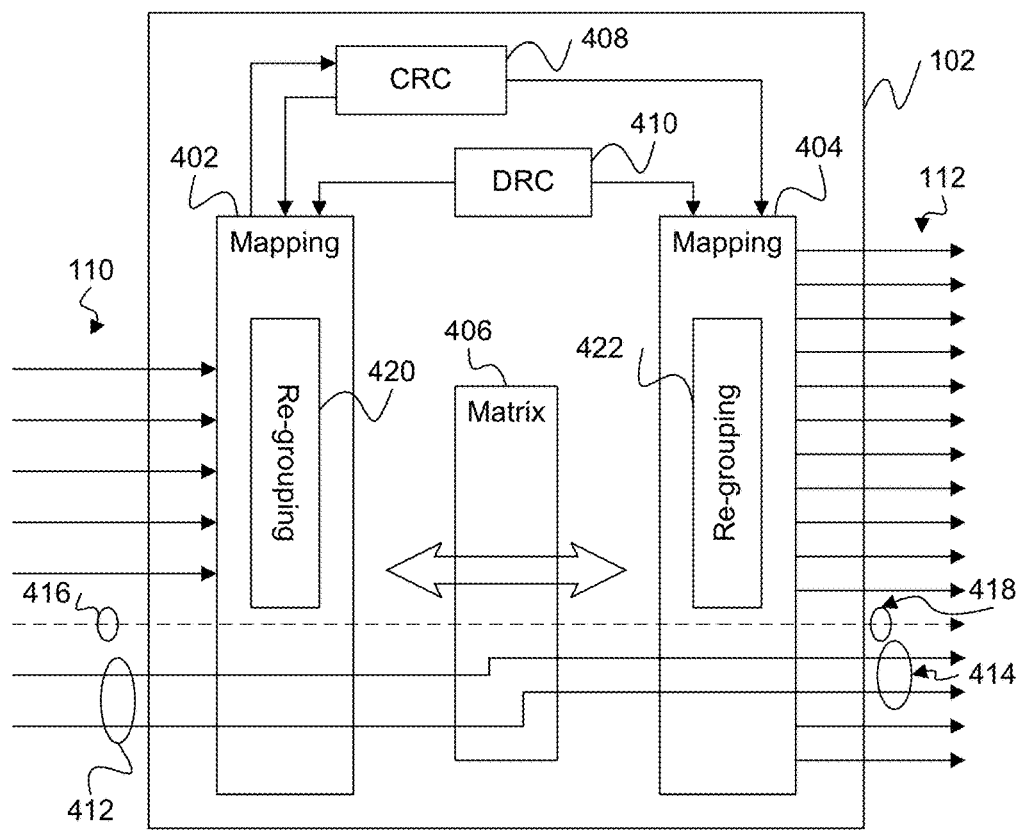

FIG. 4 schematically illustrates functional building blocks of an embodiment of the intermediate node 104 (or 106) of FIG. 1a. The node 104 comprises an upstream mapping component 402, downstream mapping component 404, a Matrix 406, a Connection Resize Control (CRC) component 408 and a Data Rate Control (DRC) component 410. The upstream mapping component 402 is adapted to manage M tributary slots 412 of ODUflex connection 116 in the direction to the ingress end node 102, while the downstream mapping component 404 is adapted to manage M tributary slots 414 of ODUflex connection 116 in the direction to the egress end node 108. The Matrix 406 is for interconnecting the various data inputs and data outputs of node 104.

Each of the mapping components comprises a collection/distribution point (CDP, not explicitly drawn). With regard to the mapping component 402, the CDP thereof is configured for collecting the client data from the set of link connections 412 of network connection 116 terminating from the upstream node 102 and distributing the client data further to a set of matrix through-connections (not explicitly drawn). With regard to the mapping component 404, the CDP thereof is configured for collecting the client data from the set of matrix through-connections and distributing the client data to the set of link connections 414 starting towards the downstream node 106.

Figure 5A:
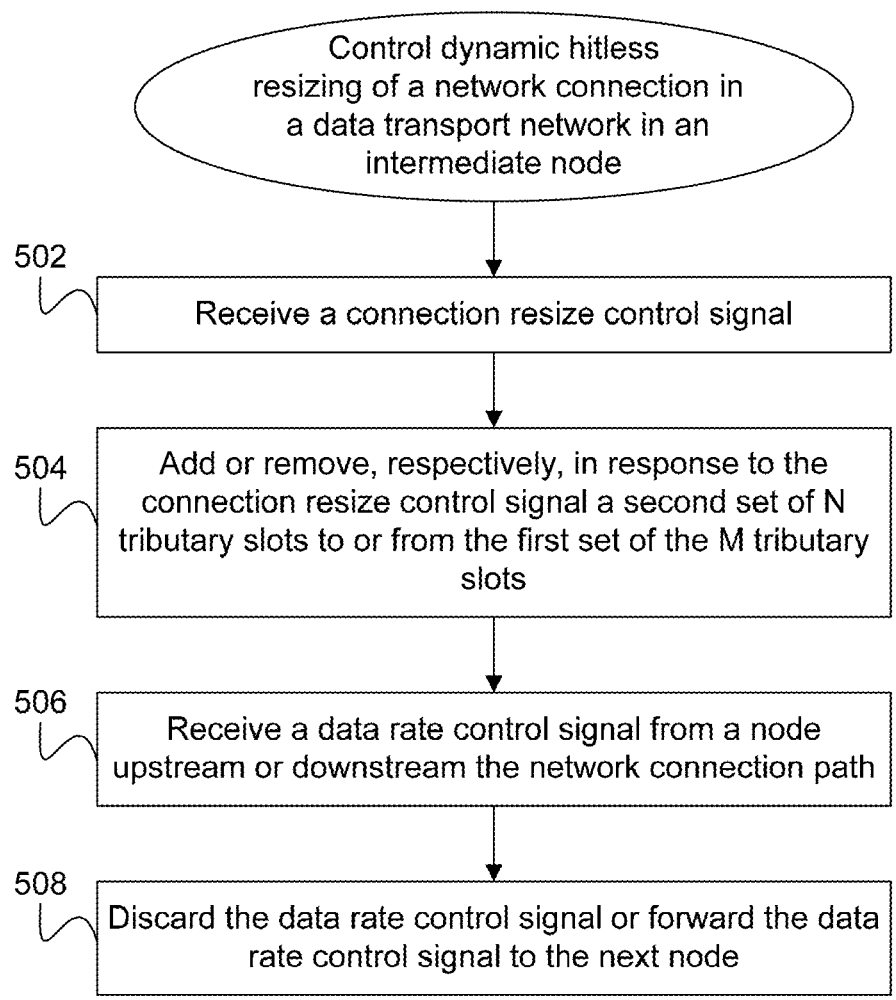
FIG. 5a is a flow diagram illustrating an operation of the intermediate node of FIG. 4.

The node 104 is also adapted to control a dynamic hitless resizing of the ODU connection 116. A corresponding operation of node 104 will be described with respect to the flow diagram illustrated in FIG. 5a. In step 502, the CRC component 206 is operative to receive a connection resize control (CRC) signal from network management. The component 408 uses the signal to accordingly control mapping component 402 and 404, for example.

In step 504, each of the mapping components 402 and 404 is triggered by the CRC component 408 (in response to the CRC signal) to add or remove, respectively, a second set of N tributary slots 416 and 418, respectively, to or from the first set of the M tributary slots 412 and 414, respectively. Thus, the network connection comprises M+N tributary slots or M−N tributary slots, respectively. Some synchronization is performed between the node and neighbouring nodes for the addition or removal of the N tributary slots in order to ensure that slots are added or removed belonging to the same link connection on both ends of each link connection.

In step 506, the DRC component 410 is operative to receive a data rate control (DRC) signal from a neighbor node of the network connection path 116 (in-band signaling is conveyed downstream in the examples illustrated here, i.e., the neighbor node is an upstream node, which is in case of node 104 the ingress end node 102 illustrated in FIGS. 2 and 3). In step 508, the DRC component 410 determines from the mapping components 402 and 404 whether or not the process initiated in step 504 of adding or marking for removal, respectively, the N tributary slots is finished already. If this is not yet the case, the DRC component 410 operates to discard the DRC signal. For example, in case the DRC signal is that a particular bit in an OH portion of a transport frame is set, then the DRC signal may be discarded by unsetting the bit (and forwarding the unset bit to the next hop along the path). If the process of adding or marking for removal the N TS has already been finished, the DRC component may keep the DRC signal, e.g. a set bit may be kept as a set bit. Then the DRC component 410 may forward the DRC signal as it is to the next node along the network connection path 116.

Figure 5B:
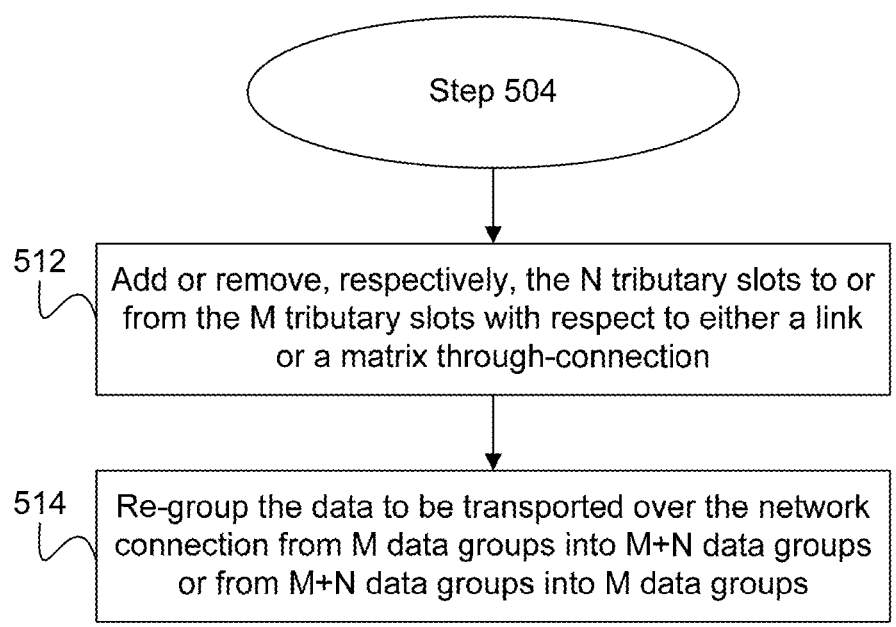

FIG. 5b illustrates in more detail the operations taken in step 504. While the steps illustrated in FIG. 5b apply to both the mapping components 402 and 404, for the sake of conciseness only the operation of mapping component 402 will be explicitly described, while mapping component 404 operates in a similar way. In sub-step 512, the mapping component 402 adds or removes, respectively, the N tributary slots 416 to or from the M tributary slots 412. The mapping component does so with respect to at least one of the link 110 and the matrix 406, more precisely the through-connection of the tributary slots 412 (and possibly 416) related to the ODUflex connection 116 over the matrix 406.

The step 514 relates to the situation at a particular point in time that, for example, only the M tributary slots 412 are assigned to the link 110 (the N TS 416 have not yet been assigned or have been de-assigned already) and M+N tributary slots are assigned to the matrix through-connection. The step 514 also relates to the situation that M+N tributary slots are assigned to the link (i.e. the N TS have been assigned already in case the ODUflex connection 116 has to be incremented or have been not yet been de-assigned in case the ODUflex connection 116 has to be decremented) and M tributary slots are assigned to the matrix through-connection. For these cases, a re-grouping function 420 (422) or M: (M+N) process is provided which operates such that the data to be transported over the ODUflex connection 116 are re-grouped from M data groups into M+N data groups or from M+N data groups into M data groups, respectively. For example, groups of M ODUflex bytes are re-grouped into groups of M+N ODUflex bytes (or vice versa).

In an alternative situation (not depicted in the figures), a step similar to step 514 may relate to the situation at a particular point in time that, for example, only the M tributary slots 412 are assigned to the link 110 and M−N tributary slots are assigned to the matrix through-connection. Such step may also relate to the situation that M−N tributary slots are assigned to the link and M tributary slots are assigned to the matrix through-connection. For these cases, the re-grouping function 420 (422) or M: (M+N) process may be adapted to operate such that the data to be transported over the ODUflex connection 116 are re-grouped from M data groups into M−N data groups or from M−N data groups into M data groups, respectively. For example, groups of M ODUflex bytes are re-grouped into groups of M−N ODUflex bytes (or vice versa).

Figure 6:
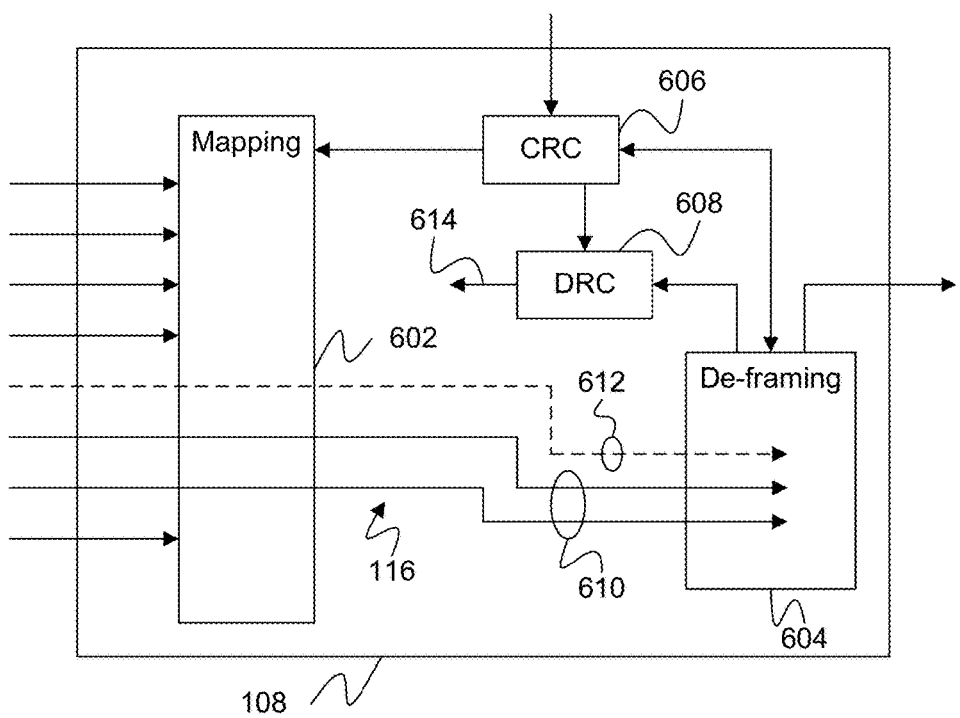

FIG. 6 schematically illustrates functional building blocks of an embodiment of the egress end node 108 of FIG. 1a. The node 108 comprises a mapping component 602, a de-framing component 604, a Connection Resize Control (CRC) component 606 and a Data Rate Control (DRC) component 608. The mapping component 602 acts to manage the ODUflex connection 116 incoming from the upstream intermediate node 106. The de-framing component 604 is adapted to extract the client data 210 (see FIG. 2) from the tributary slots 610 (or 610 and 612) contributing to the ODUflex connection 116. For example, client data packets may be extracted from an OPUflex payload area.

Figure 7:
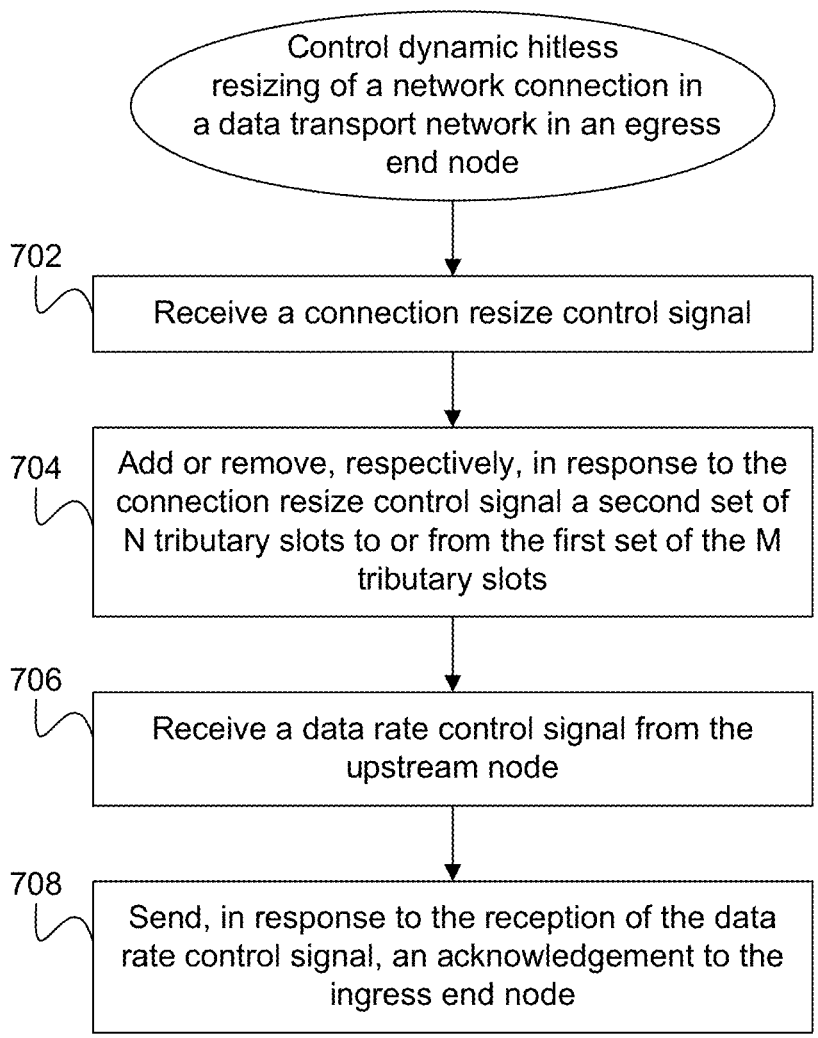

The node 108 is also adapted to control a dynamic hitless resizing of the ODU connection 116. A corresponding operation of node 108 will now be described with respect to the flow diagram illustrated in FIG. 7. In step 702, the CRC component 606 operates to receive a connection resize control (CRC) signal. In step 704, the CRC component 606 triggers, in response to the received CRC signal, the mapping component 602 to add or remove, respectively, the second set of N tributary slots 612 to or from the first set of M tributary slots 610. Thus, the network connection comprises M+N tributary slots or M−N tributary slots, respectively.

In step 706, the DRC component 608 acts to receive a data rate control (DRC) signal from the intermediate node 106. In step 708, the DRC component 608 initiates, in response to the reception of the data rate control signal, sending of an acknowledgement 614 to the ingress end node 102.

In FIGS. 2 to 7 the dynamic hitless resizing of ODUflex connection 116 has been described from the point of view of the end nodes 102, 108 and intermediate nodes 104, 106, respectively. As a general remark regarding the synchronization of different nodes, ODUflex generally may use the clock of HO ODUk, or system clock, and this will also generally be sufficient for the dynamic hitless resizing techniques described herein.

Figure 8:
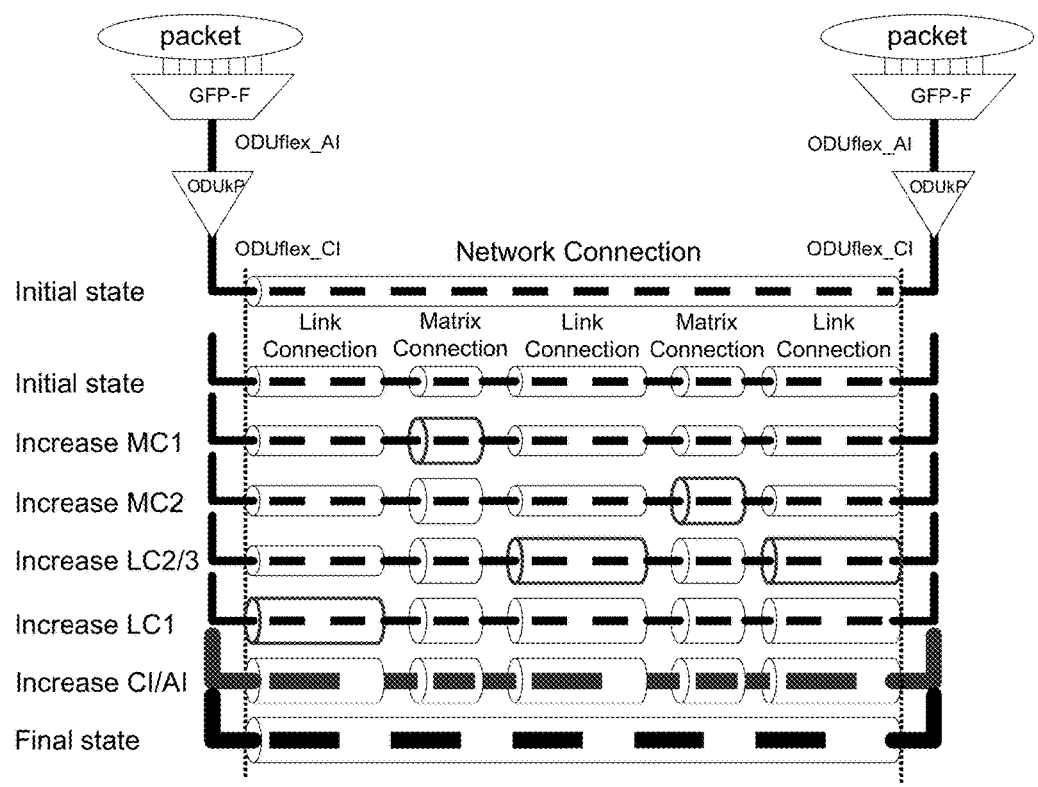
Figure 9:
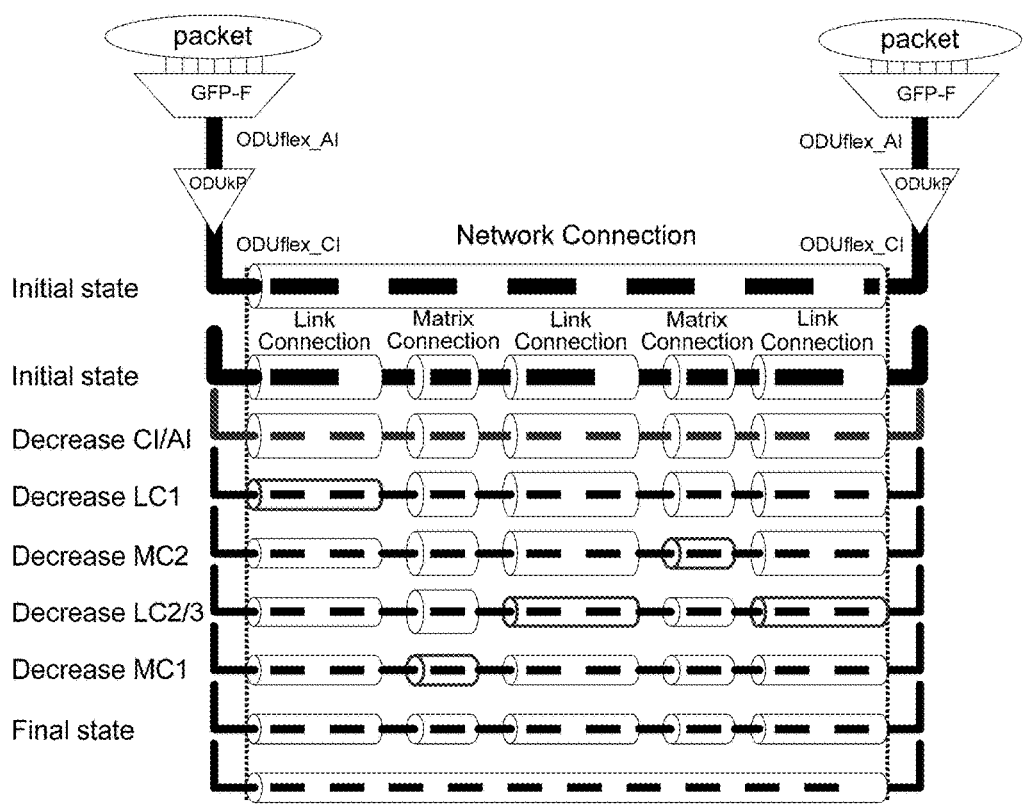

FIGS. 8 and 9 schematically illustrate the process of dynamic hitless resizing from an overall network perspective. FIG. 8 is related to incrementing an ODUflex connection, while FIG. 9 illustrates the case of decrementing an ODUflex connection. In both embodiments, with changing bandwidth requirements first the ODUflex network connection carrying the ODUflex signal is resized before resizing the ODUflex signal.

Turning first to the scenario of FIG. 8, initially the individual ODUflex link connections and matrix connections are incremented (this will be more explicitly detailed in embodiments described further below). In detail, the Matrix Connection (MC) 1 and 2 are increased, then the Link Connections (LC) 2, 3, and 1 are increased. During this process the ODUflex signal itself is kept unchanged. Only afterwards, the ODUflex signal (ODUflex_AI/CI) itself is increased. Once the ODUflex signal is increased, its larger payload bandwidth is offered to the packet layer.

With respect to FIG. 9, first a smaller payload bandwidth of the ODUflex signal is enforced on the packet layer. Second, the ODUflex signal CI/AI is decremented. Third, the individual ODUflex link connections and matrix connections are decreased. In the specific example illustrated in FIG. 9, the Link Connection LC1 is decreased first, then the Matrix Connection MC2 is decreased, then the Link Connections LC2 and LC3 are decreased, and finally the Matrix Connection MC1 is decreased. As illustrated by FIGS. 8 and 9, generally the resizing of individual link connection or matrix through-connections may be performed independent of each other.

It is to be understood that, taking a functional layer perspective, according to the techniques proposed herein a resizing of a network connection comprises a resizing of the Adaptation Information (AI) and the Characteristic Information (CI), e.g. in the service layer, while the know VCAT/LCAS techniques merely comprise a resizing of AI, as according thereto a resizing comprises usage of M smaller CI to the use of (M+N) smaller CI. In other words, VCAT/LCAS resizing does not comprises any change of existing links but only the addition of new links or removal of existing links.

Figure 10:
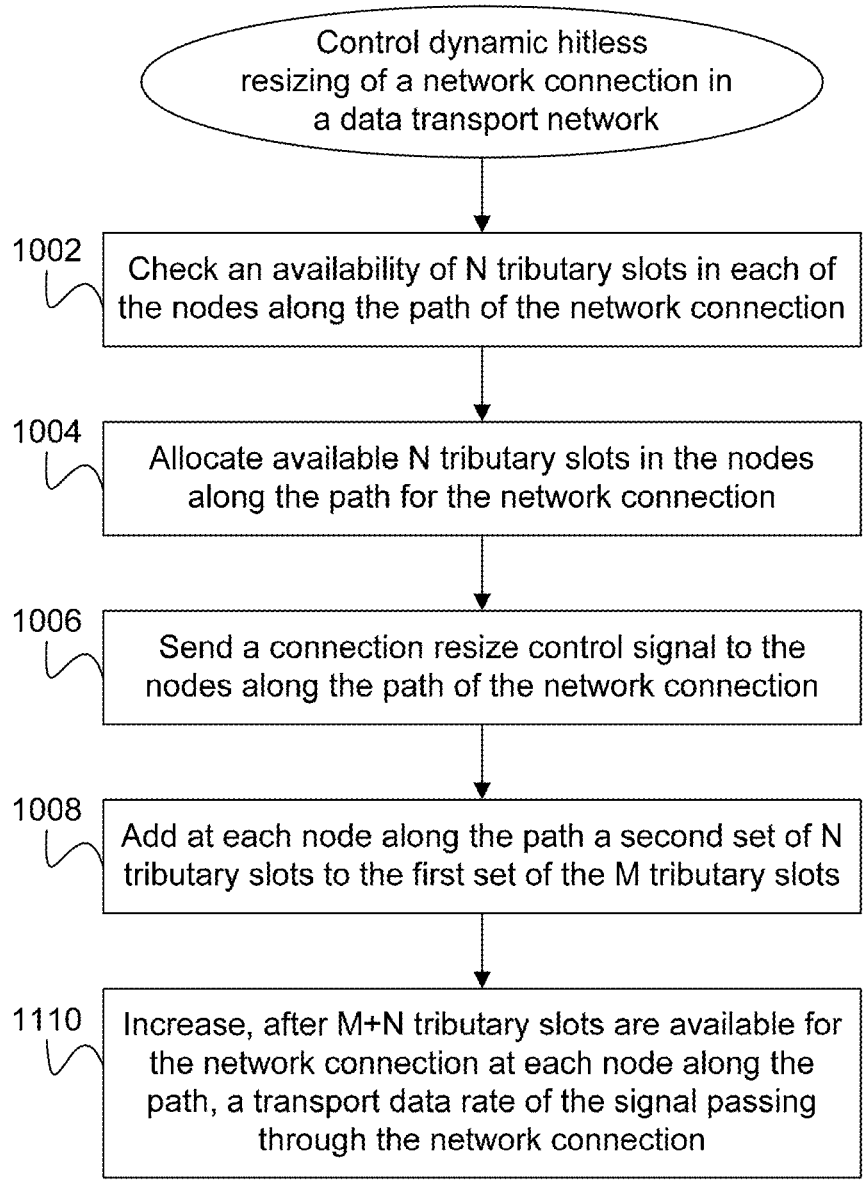

FIG. 10 illustrates in more detail a procedure for controlling dynamic hitless resizing, in particular incrementing, a network connection in a data transport network. In step 1002, an availability of N spare tributary slots (TS) is checked in each of the nodes along the path of the network connection. For example, network management may check the availability of N spare tributary slots on LO ODU links and matrices passed through by the ODUflex network connection 116 depicted in the foregoing examples.

In step 1004, if N spare TS are available at each of the nodes (more explicitly, at each of the one or two connection/distribution points of each of the nodes), the available N tributary slots are allocated in the nodes along the path for the network connection. For example, Network management (e.g. directly or via a control plane mechanism) may allocate those N tributary slots in each link and matrix throughconnection to the ODUflex connection in case there are enough spare tributary slots. As the allocation was successful, in step 1006, network management sends a connection resize control signal to each of the nodes along the path of the network connection.

In step 1008, in response to the connection resize control signal at each node along the path the allocated N tributary slots are added to the M tributary slots already included in the network connection. Specifically, the N tributary slots are added to the M tributary slots with respect to a link connection, a matrix through-connection, or both. For example, the N additional tributary slots may be added to a matrix connection in a hitless manner to, i.e. may be added to a matrix connection's ODTUk.M that carries the ODUflex. Such addition creates an ODTUk.M+N and multiplies the $C_m$ with a factor of M/(M+N) to reduce the $C_m$ value (note that $C_n$ does not change). Further, the N additional tributary slots allocated to a link connection are added in a hitless manner to the link connection's ODTUk.M that carries the ODUflex connection. The addition creates an ODTUk.M+N and multiplies the $C_m$ with a factor of M/(M+N) to reduce the $C_m$ value ($C_n$ does not change). The incrementing of each matrix or link connection's ODTUk.M can be performed independent of the incrementing of any of the other matrix/link connection's ODTUk.M.

The incrementing of the link connections may only be performed after verifying (e.g., in the data plane) that both ends of the link connections have been configured equally, i.e. the same tributary slots are connected at both ends (i.e. the N tributary slots are made available in a synchronized manner between each pair of neighbouring nodes along the network connection path). In one embodiment, the incrementing of the $C_m$ waits until all link connections and matrix connections are upgraded. Such waiting does not require management control/interactions in case the data plane performs this check (see embodiments described below for further details). The ingress end node starts to increment the $C_m$ value after having received an acknowledgement from the egress end node that all link connections have been resized. The egress determines this by inspecting the OH of the ODTUk.ts.

Hitless incrementing of an ODTUk.M to an ODTUk.(M+N) (N≥1) requires that there is at least one M: (M+N) process (re-grouping process) available in each of the intermediate nodes. This process is located between an ODUflex link and an ODUflex matrix through-connection. The M:

(M+N) process converts groups of M ODUflex bytes into groups of (M+N) ODUflex bytes, or vice versa. The process is active in a period when either a link connection occupies M tributary slots and the matrix through-connection occupies (M+N) tributary slots, or when a link connection occupies (M+N) tributary slots and the matrix through-connection occupies M tributary slots.

In step 1010, a transport data rate of the signal passing through the network connection is increased, but only after the M+N tributary slots are available for the network connection at each node along the path in a synchronized manner between each pair of neighbouring nodes. For example, the bandwidth (bit rate) of an ODUflex signal expressed in the value of $C_m$ is incremented in steps of 1 per ODTUk.M+N multiframe ($C_n$ now changes also). The mapping processes at intermediate nodes follow this incrementing immediately (this requires dedicated processing in the mapping components).

Figure 11:
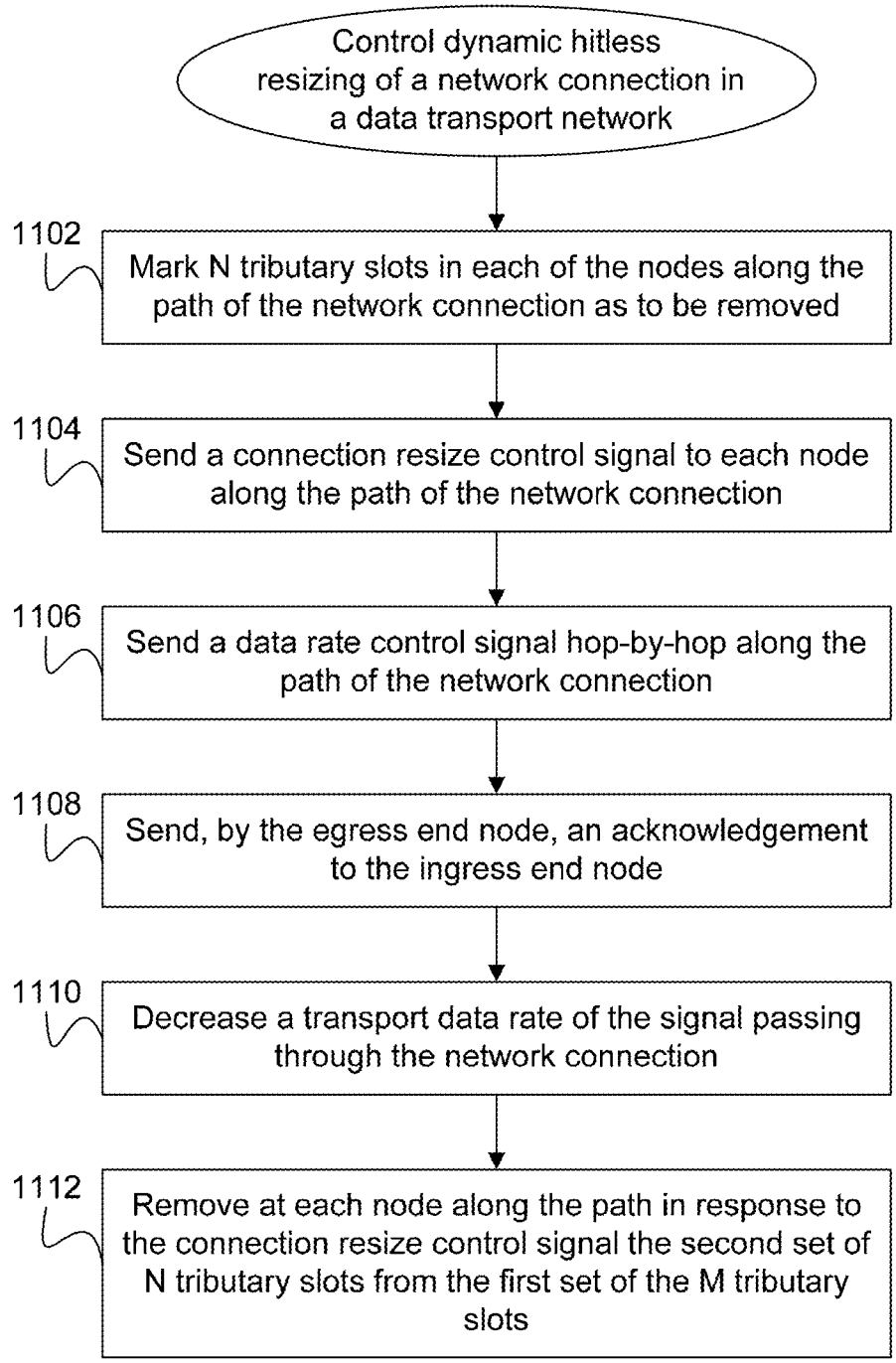

FIG. 11 illustrates in more detail a procedure for controlling dynamic hitless resizing, in particular decrementing, a network connection in a data transport network. In step 1102, N of M tributary slots are marked. For example, the network management (or a control plane mechanism) may mark N tributary slots in each link connection endpoint of the ODUflex connection 116 of FIG. 1 as "to be removed". In step 1104, a connection resize control signal is sent to each node along the path of the network connection.

In step 1106, by the ingress end node a data rate control signal is sent hop-by-hop along the path of the network connection, wherein the data rate control signal is discarded by a node which has not finished the step of adding or marking for removal, respectively, the N tributary slots. In step 1108, the egress end node sends in response to a reception of the data rate control signal an acknowledgement to the ingress end node. After N tributary slots have been prepared for removal at each node along the path of the network connection in a synchronized manner between each pair of neighbouring nodes, in step 1110, a transport data rate of the signal passing through the network connection is decreased by the ingress end node.

Eventually, in step 1112, in response to the connection resize control signal at each node along the path the marked N tributary slots are removed from the M tributary slots. More specifically and with respect to an ODUflex example, the bandwidth (bit rate) of an ODUflex signal expressed in the value of $C_m$ is decremented in steps of 1 per ODTUk.M multiframe ($C_n$ changes also); the mapping processes at intermediate nodes are adapted thereto, i.e. follow this decrementing immediately. Then, the N tributary slots within a link connection are removed in a hitless manner from the link connection's ODTUk.M that carries the ODUflex. The removal creates an ODTUk.M−N. The $C_m$ is multiplied with a factor of M/(M−N) to increase the $C_m$ value (note that $C_n$ does not change). The decrementing of the ODUflex link connection may only be performed after verifying (e.g., in the data plane) that both ends of the link connections have been configured equally, i.e. the same tributary slots carry the ODUflex connection at both ends.

Additionally, the N tributary slots allocated to a matrix through-connection are removed in a hitless manner from the matrix connection's ODTUk.M that carries the ODUflex connection. The removal creates an ODTUk.M−N and multiplies the $C_m$ with a factor of M/(M−N) to increase the $C_m$ value ($C_n$ does not change).

The decrementing of the ODUflex's $C_m$ has to be performed before a link connection or matrix connection is resized. In case the data plane performs this check, such waiting does not require management control/interactions. The decrementing of each matrix or link connection's ODTUk.M can be performed independent of the decrementing of any of the other matrix/link connection's ODTUk.M. After the removal of the N slots, M−N tributary slots are available for the network connection at each node along the path.

With regard to the connection resize control signaling received by each of the nodes along the path of the network connection in steps 1006 and 1104, this signaling may be sent once per resize event to each node and may comprise, for example, a connection ID indicating the network connection, an indication of whether to increase or decrease the connection (and to which data rate or bandwidth), a list of the tributary slots to be added or removed, and, for each of the TS in the list, a tributary port ID to which the particular slot is to be added or from which the particular slots is to be removed. No further network management operation is generally required.

FIG. 12 illustrates a format for in-band (data plane) link and matrix through-connection bandwidth resize control signaling (not to be confused with the connection resize control signals received by each node from network management) and data rate control signaling to be used for controlling a dynamic hitless resizing of an ODUflex connection in an OTN, i.e. hitless ODUflex(GFP)/M increase and decrease. The in-band connection resize control signaling is required in order that two neighbouring nodes may inform each other on which links are currently active during the resizing process in order to avoid that packets are lost (i.e. in order for the resizing being performed in hitless manner). The control may be mostly conveyed by in-band resize control overhead located in OPUk tributary slot overhead bytes.

Specifically, the overhead in column 15, rows 1, 2, 3 of OPUk tributary slots can be used, namely of those slots which are either allocated as additional tributary slots for an ODUflex(GFP) tributary port (in case of incremental resize), or which are marked as tributary slots to be removed from an ODUflex(GFP) tributary port (in case of decremental resize). Thus, ODUflex Resize Control Overhead (RCOH) may be carried in the OPUk Tributary Slot Overhead (TSOH) of the allocated, but not yet active or removable, but not yet removed OPUk TSs.

This RCOH may support link and matrix connection (ODTUk.M) resize control fields and ODUflex data rate (bit rate) resize control fields. The default value of all fields might be '0'. According to the embodiment illustrated in FIG. 12, the signaling parameters CTRL (Connection Control), TPID (Tributary Port ID), TSGS (Tributary Slot Group Status), TSCC (Tributary Slot Connectivity Check) and NCS (Network Connection Status) might be used.

With regard to link and matrix through-connection resize control, the CTLR field is a 2-bit control field with NORM (11), ADD (01) and REMOVE (10) states and an IDLE (00) (unsourced) indication. The TPID field is a 3(4)-bit (HO OPU2), 5(6)-bit (HO OPU3) and 7-bit (HO OPU4) Tributary Port ID field carrying the Tributary Port number to which the tributary slot is to be added or from which the TS is to be removed. The 1-bit tributary slot group status (TSGS) field with values ACK (1) and NACK (0) is generated by the sink (egress) to confirm to the source (ingress) that the tributary slots for addition or removal have been configured also at the sink end and that the sink end is ready to receive the increase of the ODTUk.M in to the ODTUk.M+N, or decrease of the ODTUk.M into the ODTUk.M−N, respectively.

After receipt of TSGS=OK, the ingress end node can change its ADD or REMOVE state to a NORM state and start the incrementing or decrementing process at the boundary of the next HO OPUk multiframe.

Data rate control acts for hitless incrementing/decrementing of the ODUflex(GFP) signal bit rate expressed in $C_m$. The 1-bit tributary slot connectivity check (TSCC) signal, with a value of TSCC=1 is inserted by the first ODUkP/ODUj-21_A_So function and passed through from ODUkP/ODUj-21_A_Sk function on the ingress port of an intermediate node to the ODUkP/ODUj-21_A_So function on the egress port of that node until the signal is received by the last ODUkP/ODUj-21_A_Sk function. Such passing through between ingress and egress ports on intermediate nodes may be performed in hardware or in software. If a re-grouping or M: (M+N) process is active in the intermediate node, this process inserts TSCC=0 in the (M+N) direction. Only when the process is already removed, the value of the received TSCC bit is forwarded as it is.

When the TSCC=1 indication is received by the ODUflex (GFP) egress end node (ODUkP/ODUj-21_A_Sk function) on all the N tributary slots, then the sink will acknowledge this receipt to the source via the 1-bit Network Connection Status (NCS). The source can then start incrementing/decrementing the ODUflex(GFP) $C_m$ value, i.e. increase or decrease, respectively, the ODUflex(GFP) signal. In the decrementing case, the completion of the ODUflex(GFP) signal resize can be signaled by setting TSCC=0. Once TSCC=0 has passed through the intermediate nodes and is received by the last ODUkP/ODUj-21_A_Sk function, this function will acknowledge its receipt by setting NCS=0 (NACK).

Figure 13A:
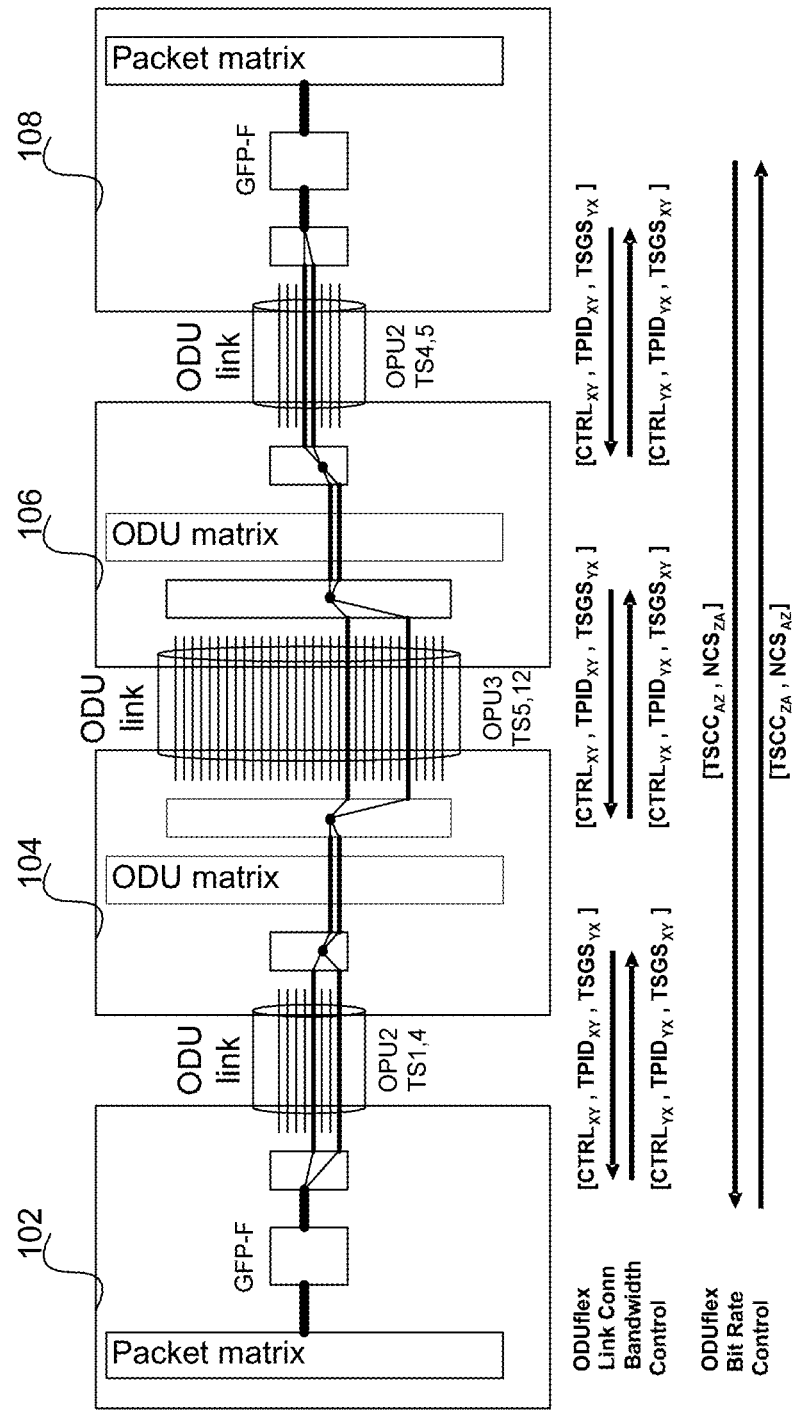

FIGS. 13a to 13l schematically illustrate in some detail an embodiment of a process of hitlessly incrementing the ODUflex connection 116 depicted in the foregoing figures. The boxes depict, from left to right, the ingress end node 102, the intermediate nodes 104 and 106, and the egress end node 108. FIG. 13a illustrates an initial state of the ODUflex (GFP) connection, according to which the connection is carried by an ODTU2.2 between ingress end node 102 and intermediate node 104, an ODTU 3.2 between the intermediate nodes 104 and 106, and another ODTU2.2 between the intermediate node 106 and egress end node 108. Bottom arrows denote ODUflex link connection bandwidth control (in-band connection resize control) signaling and ODUflex bit rate (data rate) control signaling, respectively. The connection bandwidth control signaling is conveyed hop-by-hop, while the bit rate control signaling can be conveyed in any way end-to-end. It is preferred that each of link connection bandwidth control as well as bit rate control is conveyed for each TS which is to be added or removed.

Figure 13B:
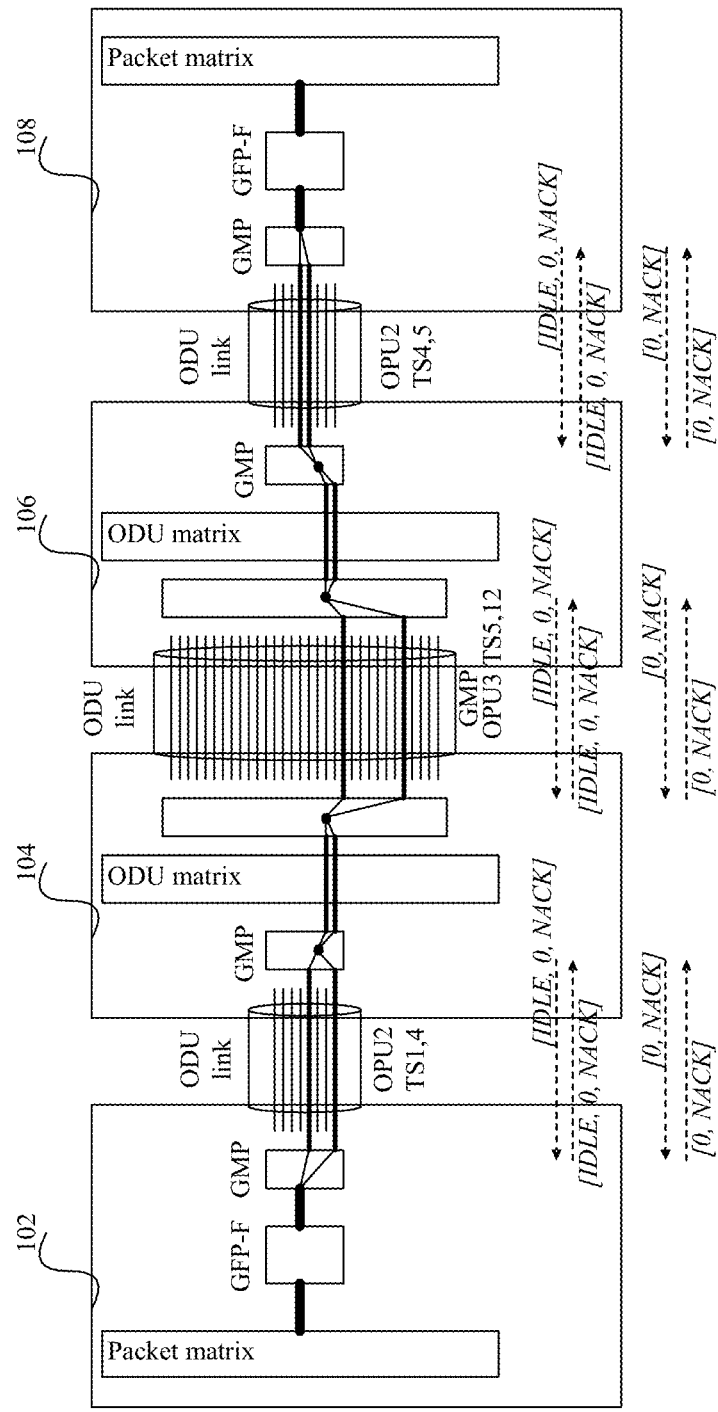

FIG. 13b is another illustration of a static situation (no resizing). Without any resizing going on, the resize control overhead in the unallocated OPUk tributary slots is carrying reserved bit values (e.g., all '0's). These default values will be interpreted as CTRL=IDLE, TPID=0, TSGS=NACK, TSCC=0 and NCS=NACK. The default values are represented by italic text and dashed lines in the figures. Normal text and solid lines indicate that the control parameters in the resize control overhead are used, i.e. actively sourced. Bold text is intended to indicate that the field carries a new value.

Figure 13C:
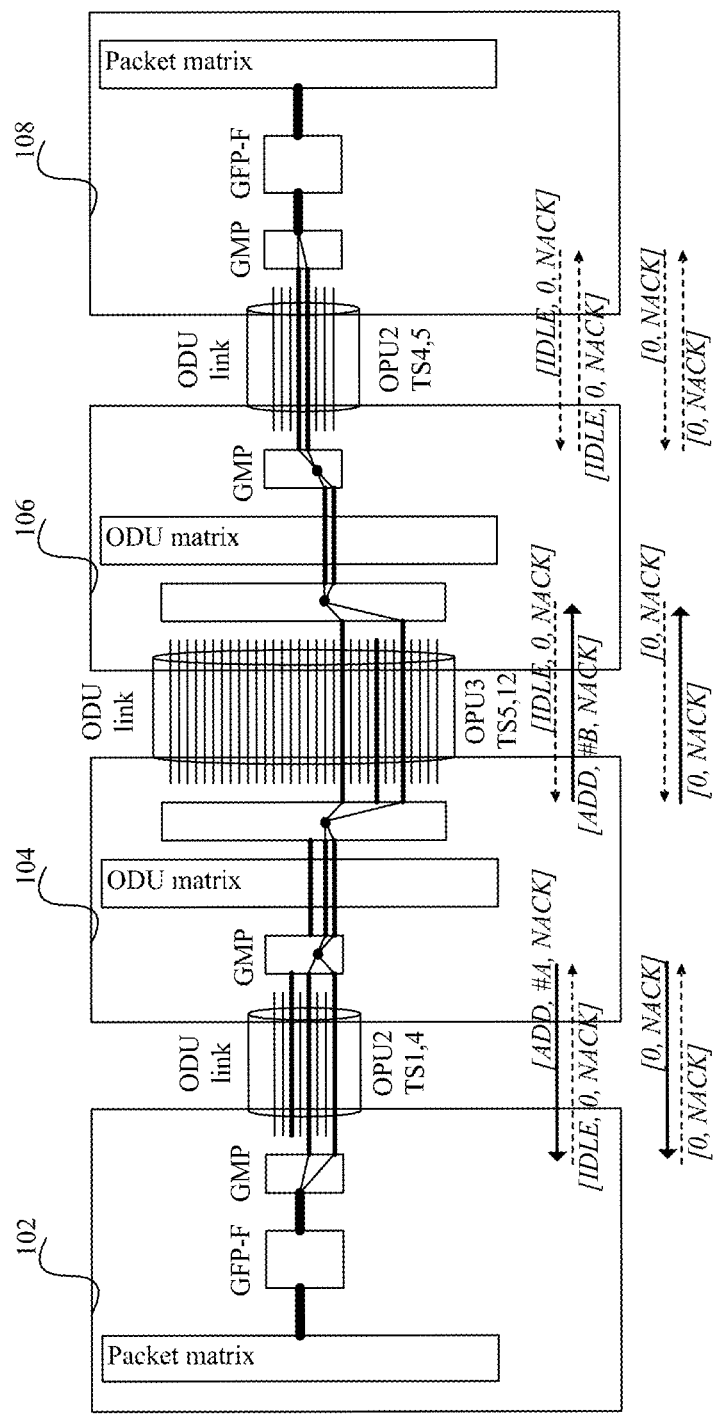
Figure 13D:
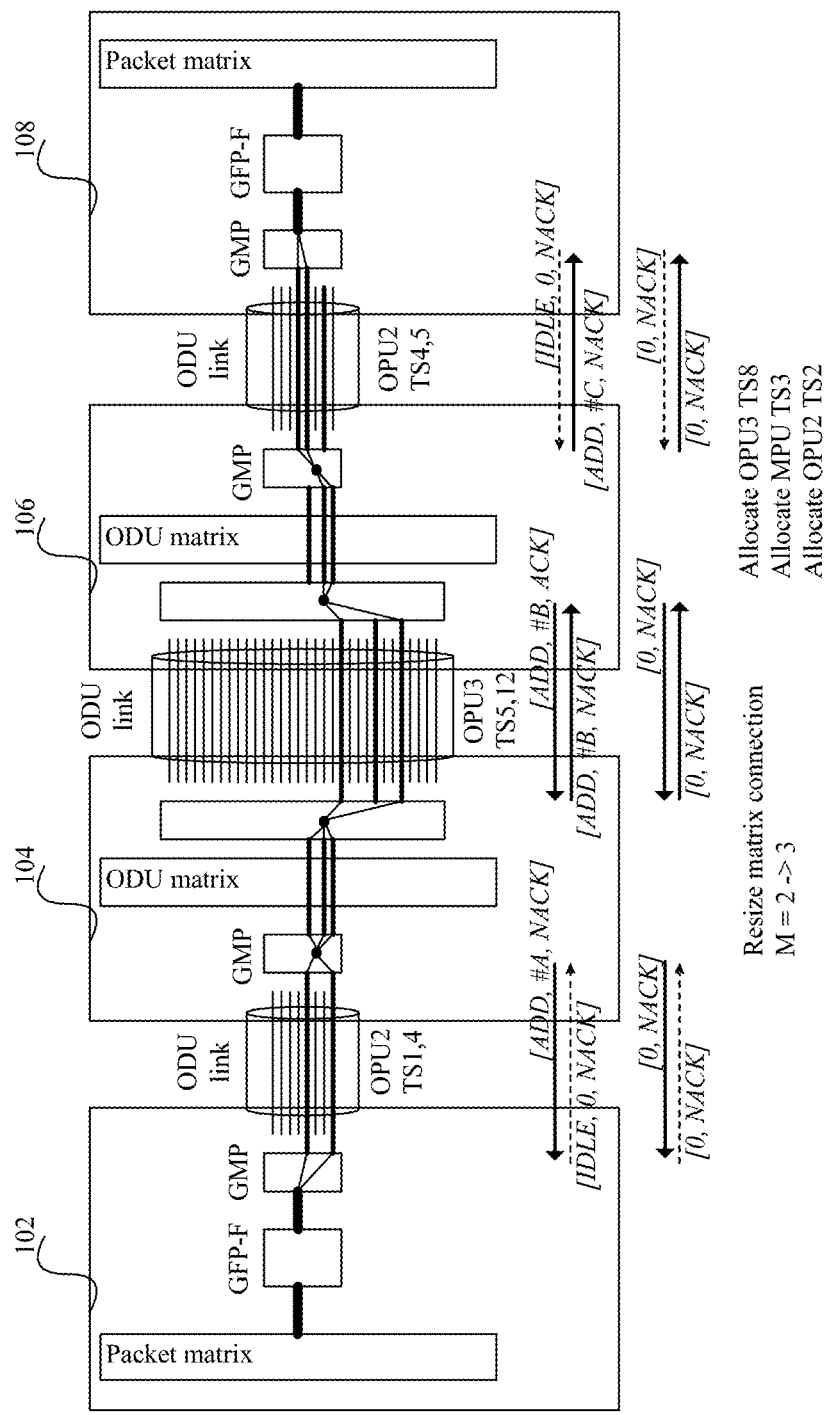

FIG. 13c illustrates an initial state of the ODUflex hitless resizing. The intermediate node 104 is configured by network management connection resize control to increase the ODTU2.2, the internal matrix through-connection, and the ODTU3.2 to intermediate node 106. FIG. 13d shows that the matrix connection is resized in node 104. Both GMPs (Generic Mapping Point, also termed "Collection/Distribution Function CDP herein) of node 104 have been reconfigured from the status shown in FIG. 13c with two matrix through-connections to the status shown in FIG. 13d with three matrix through-connections associated with the network connection 116.

Figure 13E:
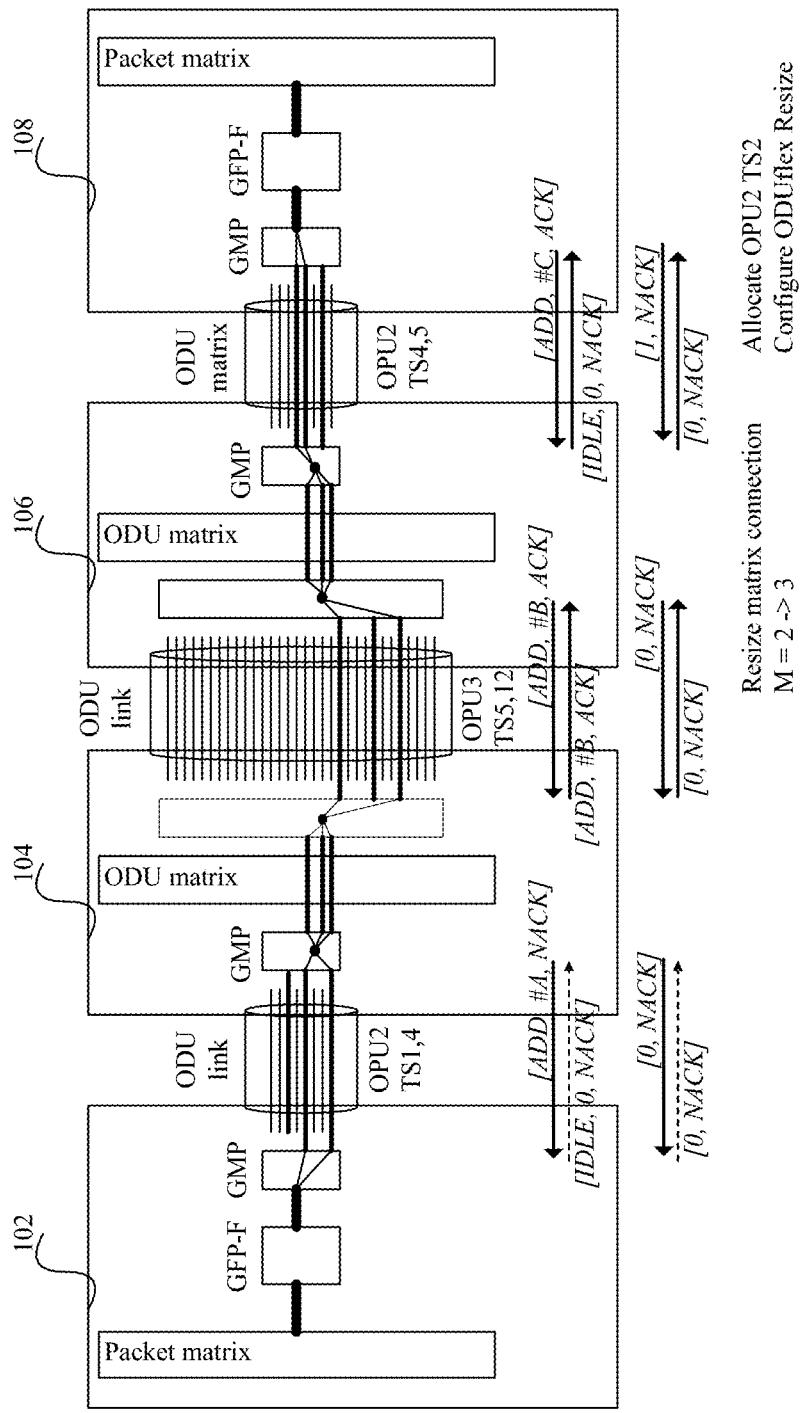

Further, FIG. 13d shows that the intermediate node 106 is instructed by network management to increase the ODTU3.2, its internal matrix connection and ODTU2.2 to egress end node 108 (network management may instruct all the nodes in arbitrary order and such instruction need not be done in parallel). FIG. 13e illustrates that the matrix connection is resized in node 106. The egress end node 108 is instructed by network management to also increase the ODTU2.2, and to increase ODUflex (GFP)/2.

Figure 13F:
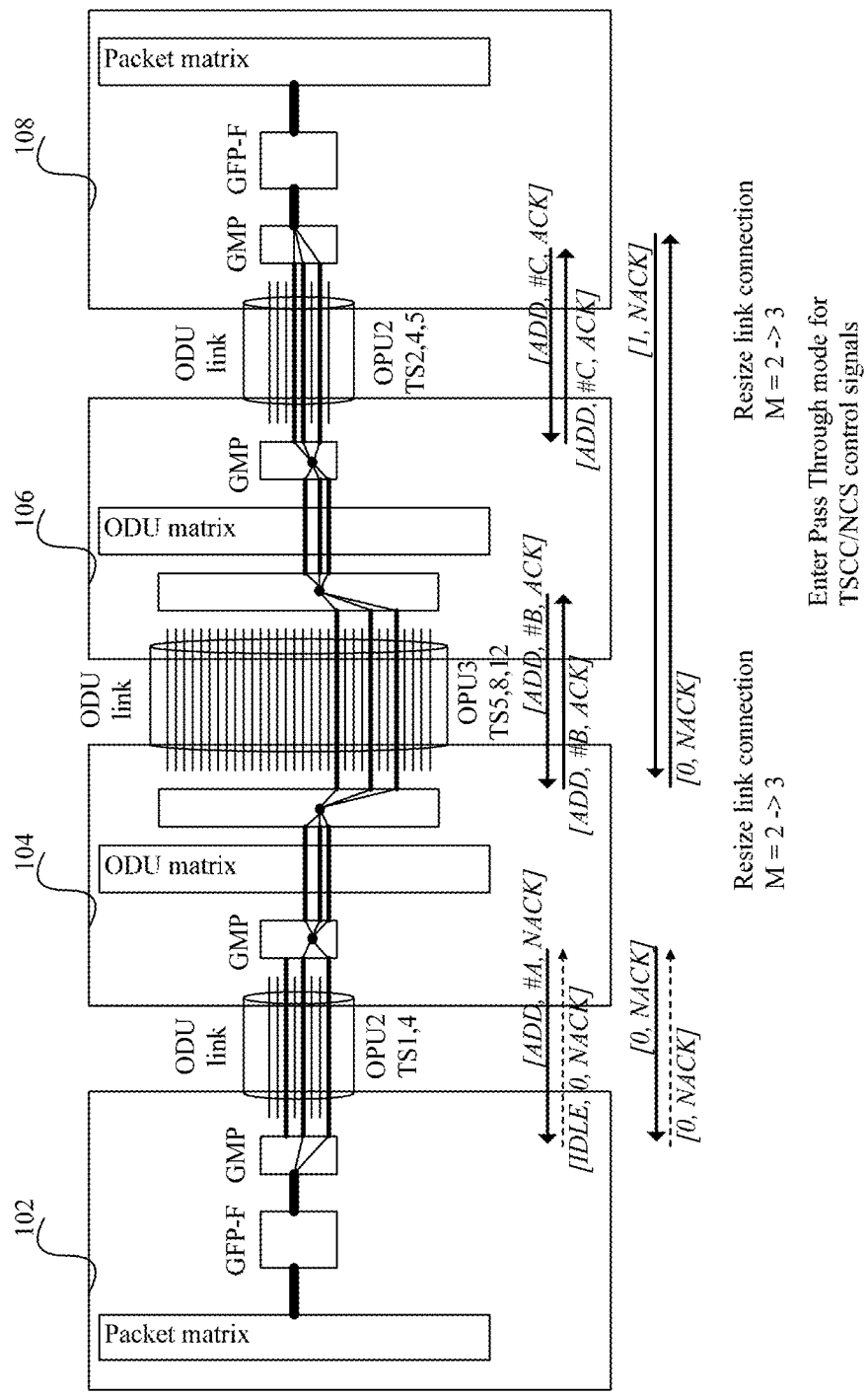
Figure 13G:
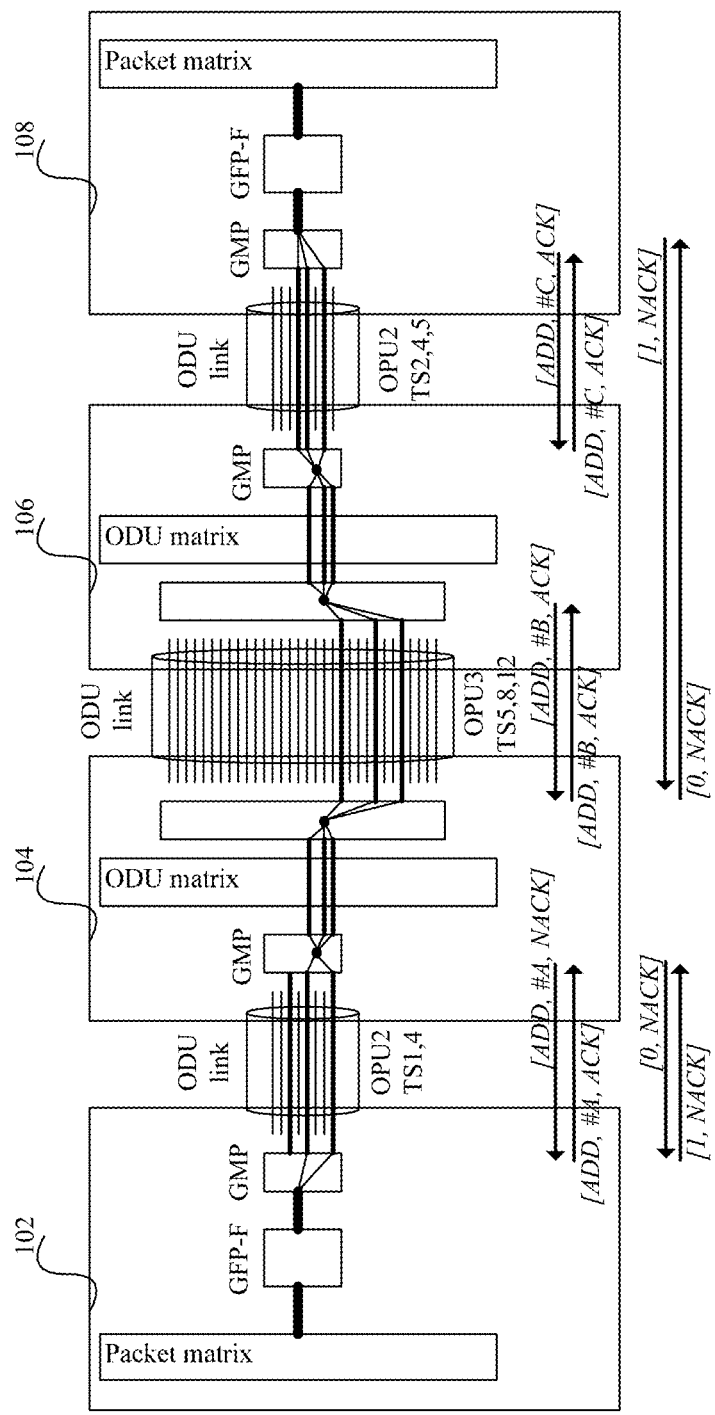

FIG. 13f shows that the links between the nodes 104 and 106, and between 106 and 108 are resized. The corresponding CDPs (GMPs) of both are thus dynamically re-configured to support three links instead of only two. Now the in-band bitrate resizing control fields can already be passed through via node 106. FIG. 13g shows that the ingress end node 102 is configured to increase ODTU2.2 to intermediate node 104, and to increase ODUflex (GFP)/2.

Figure 13H:
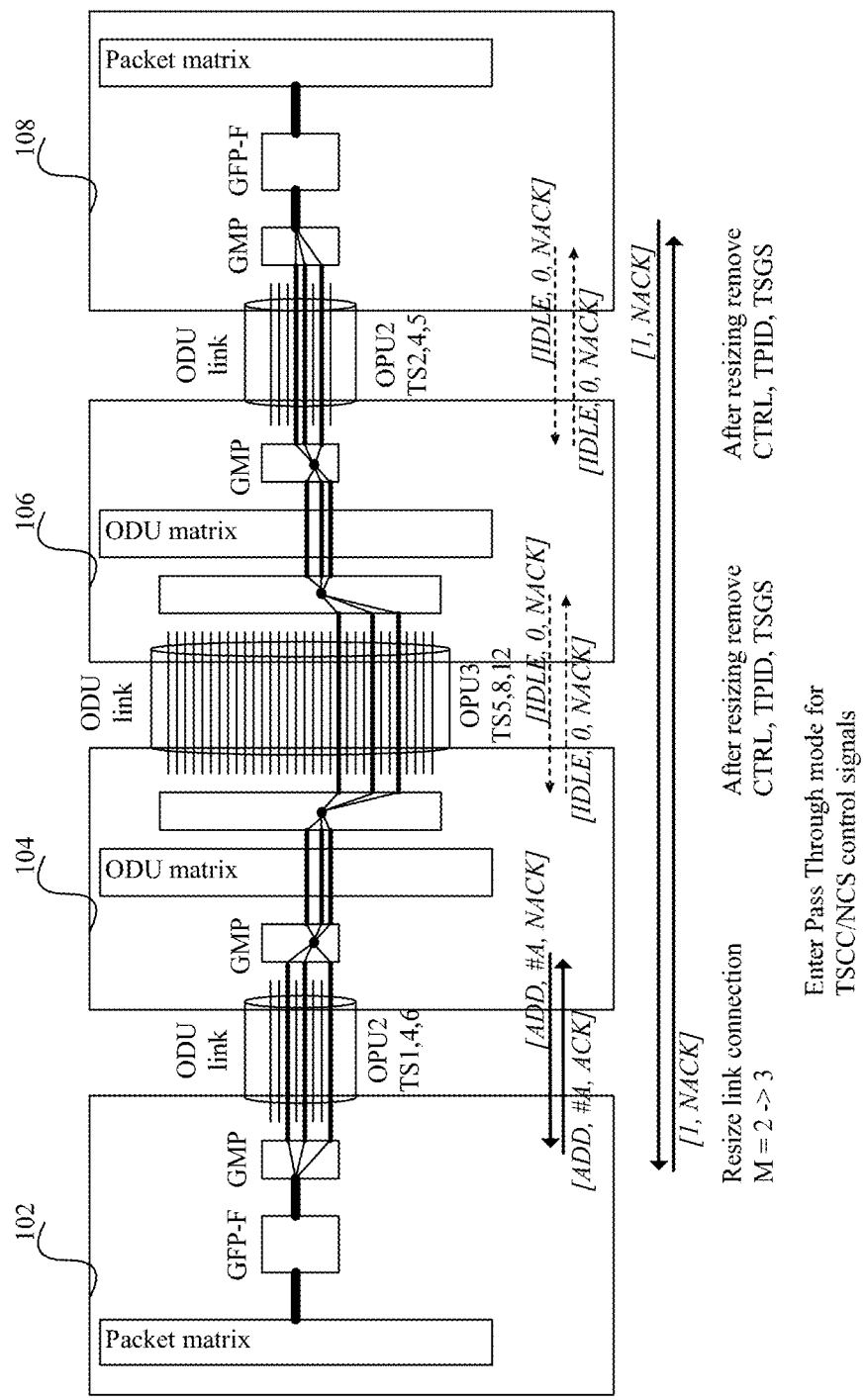
Figure 13I:
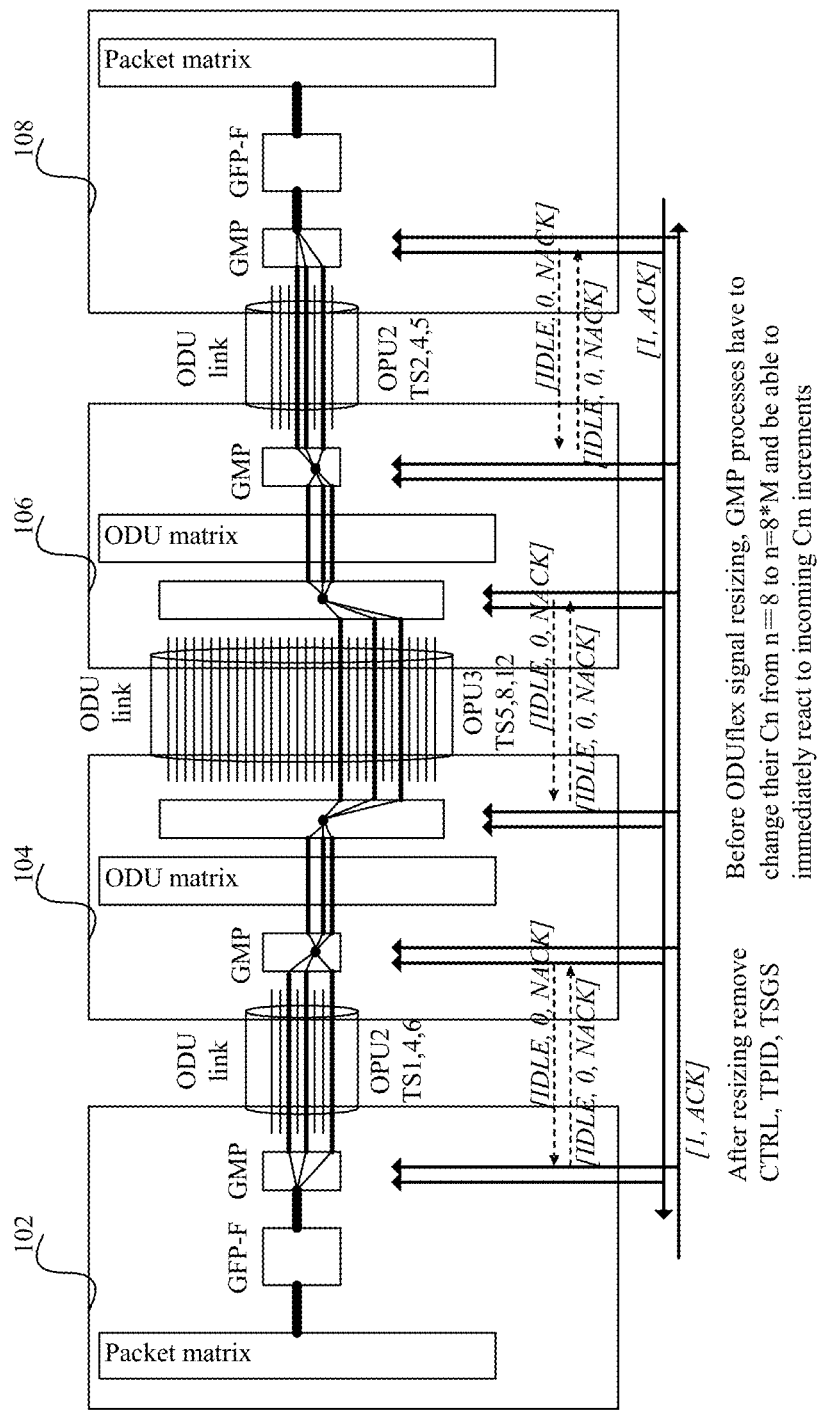

FIG. 13h illustrates resizing of links between nodes 102 and 104. The resize control overhead between nodes 104 and 106, and between 106 and 108 goes back to default values. In-band bit rate control can be passed through along the entire path between end nodes 102 and 108. According to FIG. 13i, resize control overhead is back to default values also between nodes 102 and 104. Based on bit rate control signaling, $C_n/C_m$ modes are resized in the end nodes 102 and 108, respectively. The mapping processes (called Generic Mapping Processes, GMPs here) are configured to immediately respond to incoming $C_m$ increments.

Figure 13J:
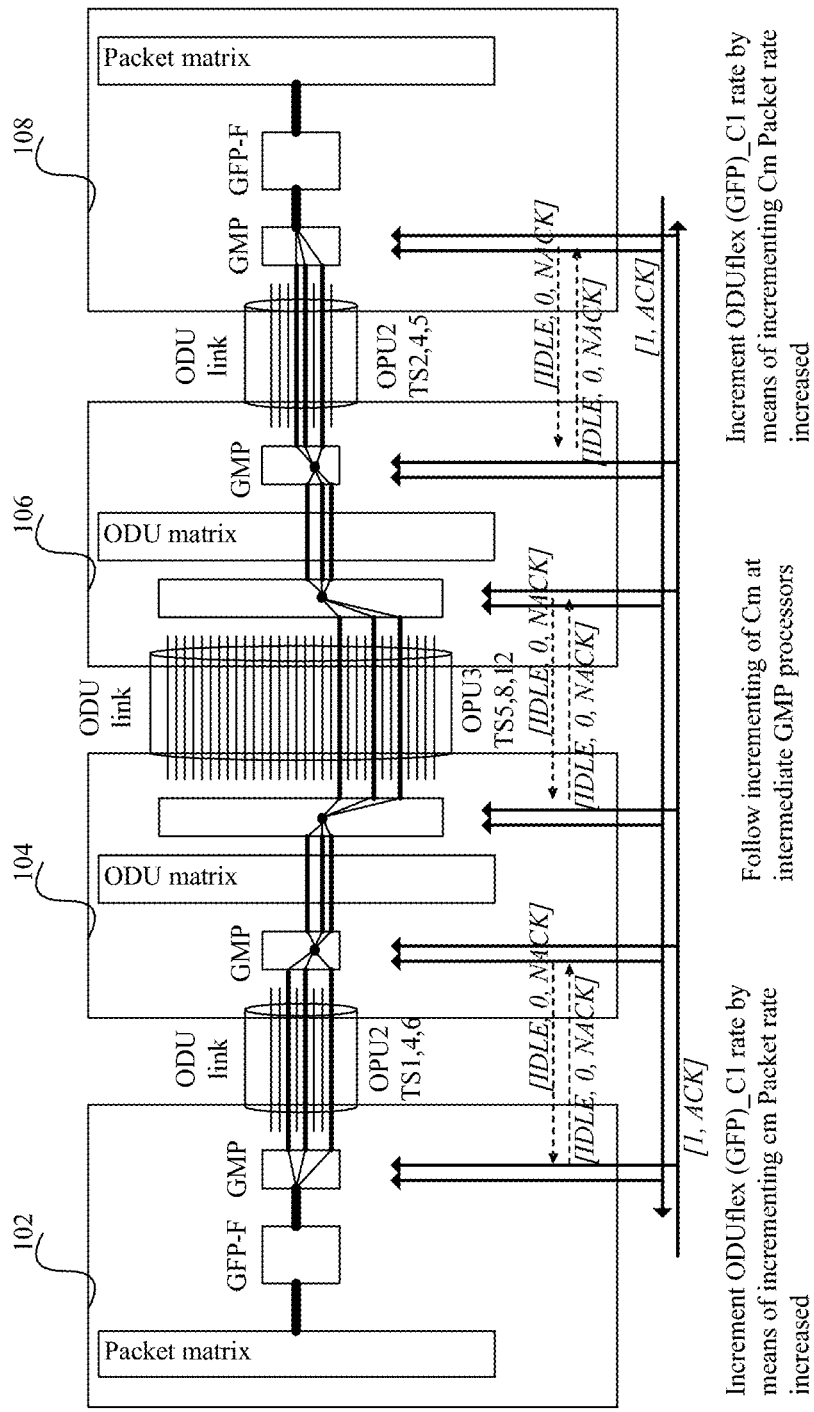
Figure 13K:
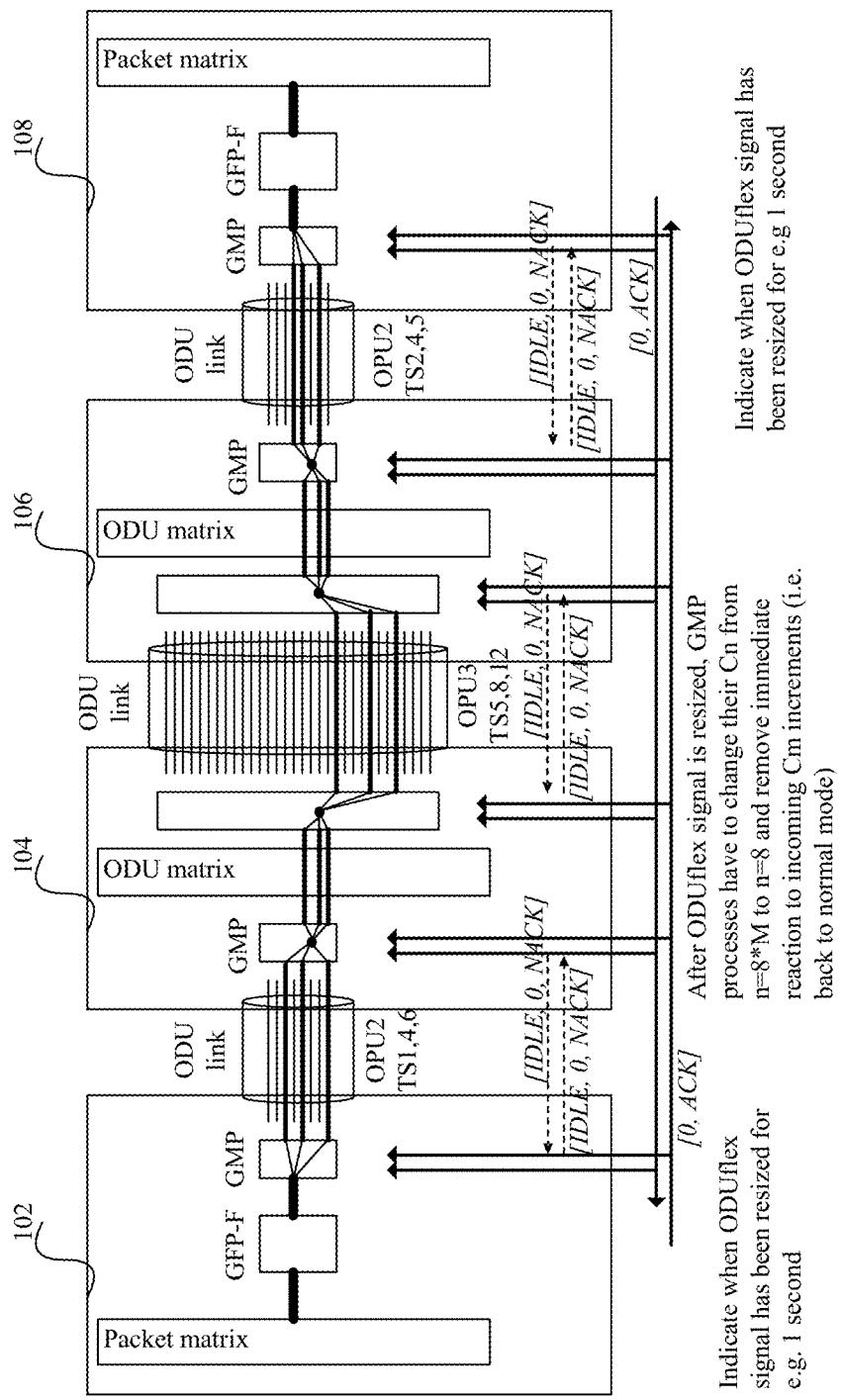
Figure 131:
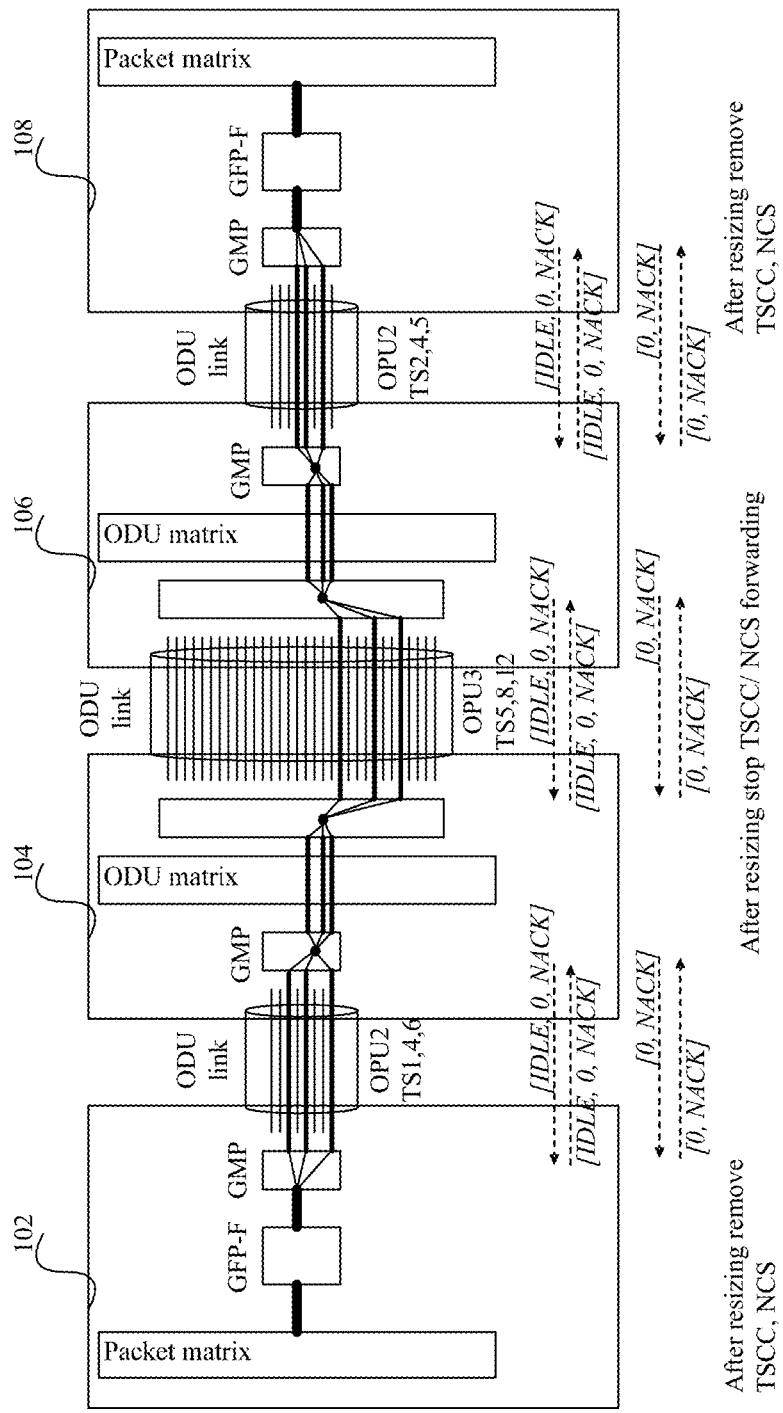

FIG. 13j illustrates that ODUflex (GFP)/2 is incremented by incrementing the transmitted $C_n/C_m$ modes in the end nodes. The intermediate GMP processors follow the incrementing. FIG. 13k shows that the intermediate processors change their $C_n$ to normal mode (n=8). FIG. 13l shows the static state after resizing is finished: The resized ODUflex (GFP)/3 is available and in use. The resize control overhead is back to default values over the network connection.

Figure 14A:
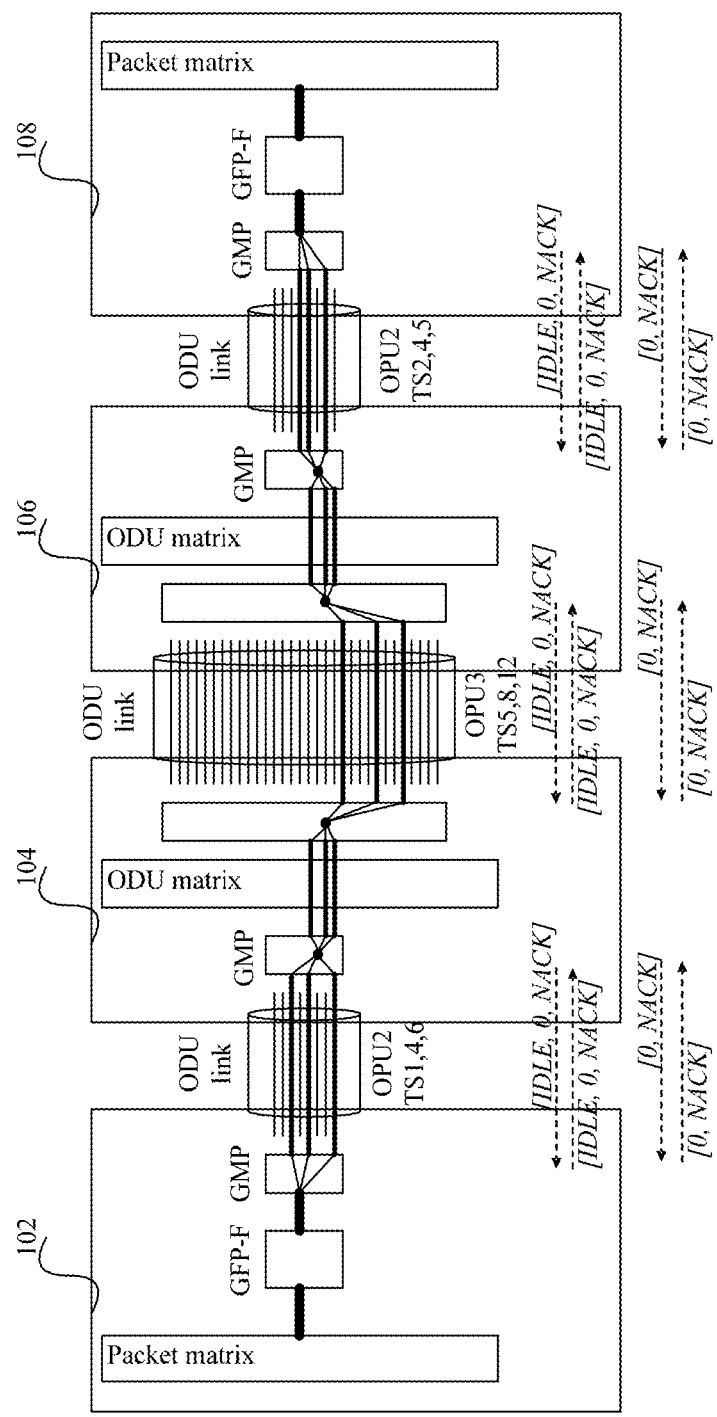

FIGS. 14a to 14l illustrate, in a similar manner as FIGS. 13a to 13l, details of an embodiment of a process of hitlessly decrementing the ODUflex connection 116 of FIG. 1. An initial state of the ODUflex (GFP) connection may be as illustrated by FIG. 14a.

Figure 14B:
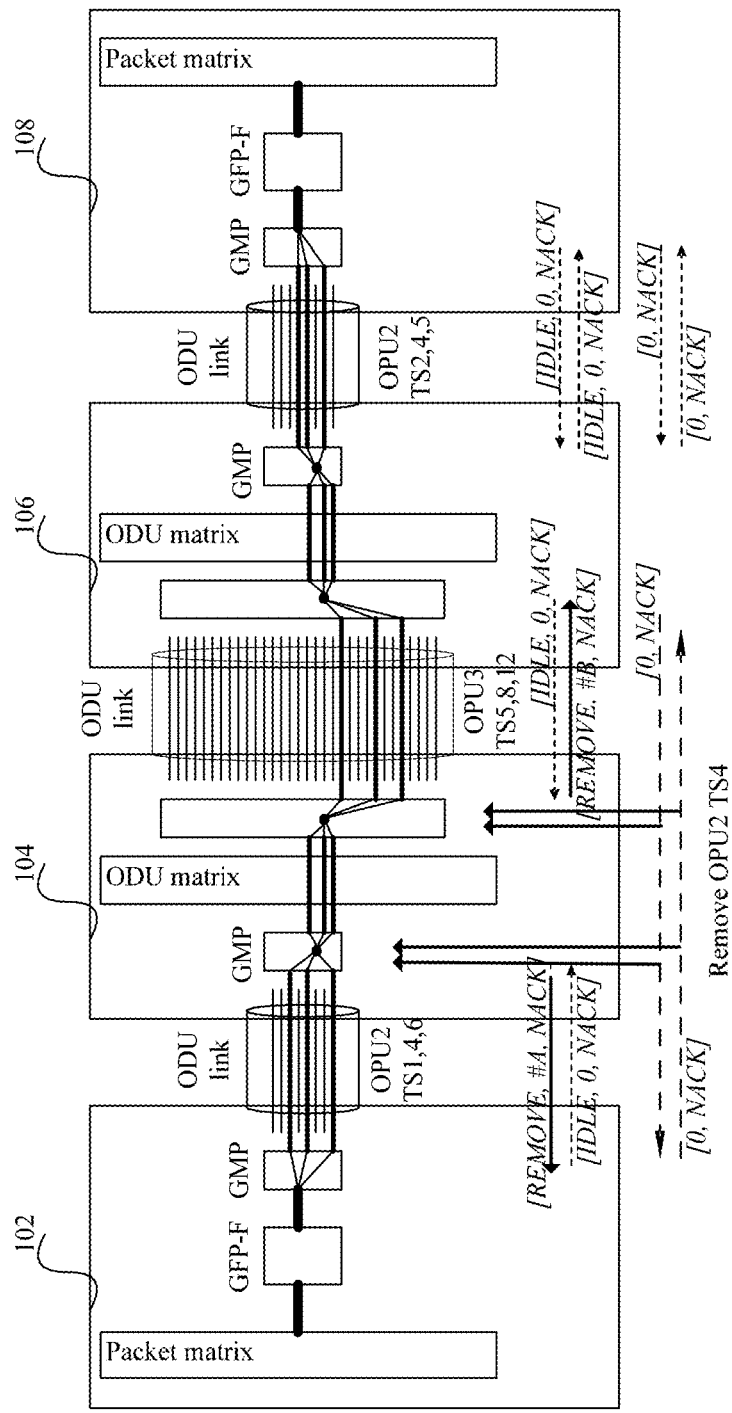
Figure 14C:
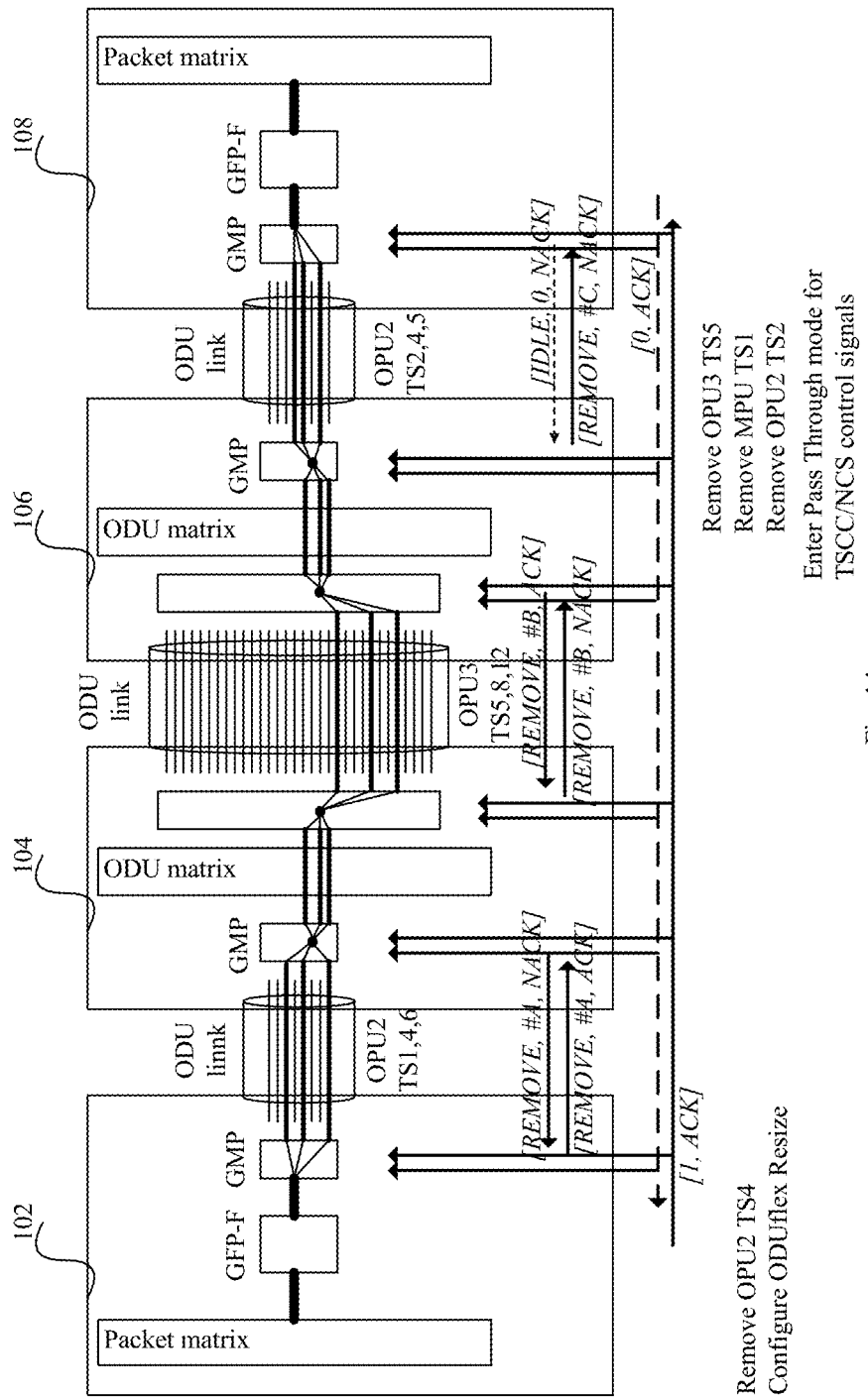

FIG. 14b illustrates that the intermediate node 104 is instructed to decrease the ODTU2.3 to ingress end node 102, the internal matrix through-connection, and the ODTU3.3 to intermediate node 106. The pass-through mode for the resize control overhead is to be entered by intermediate node 104. In FIG. 14c it is shown that node 106 is instructed to decrease the ODTU3.3, the internal matrix connection and the ODTU2.3. Resize connection control is to be passed through node 106. Further, ingress end node 102 is configured to decrease ODUflex (GFP)/3.

Figure 14D:
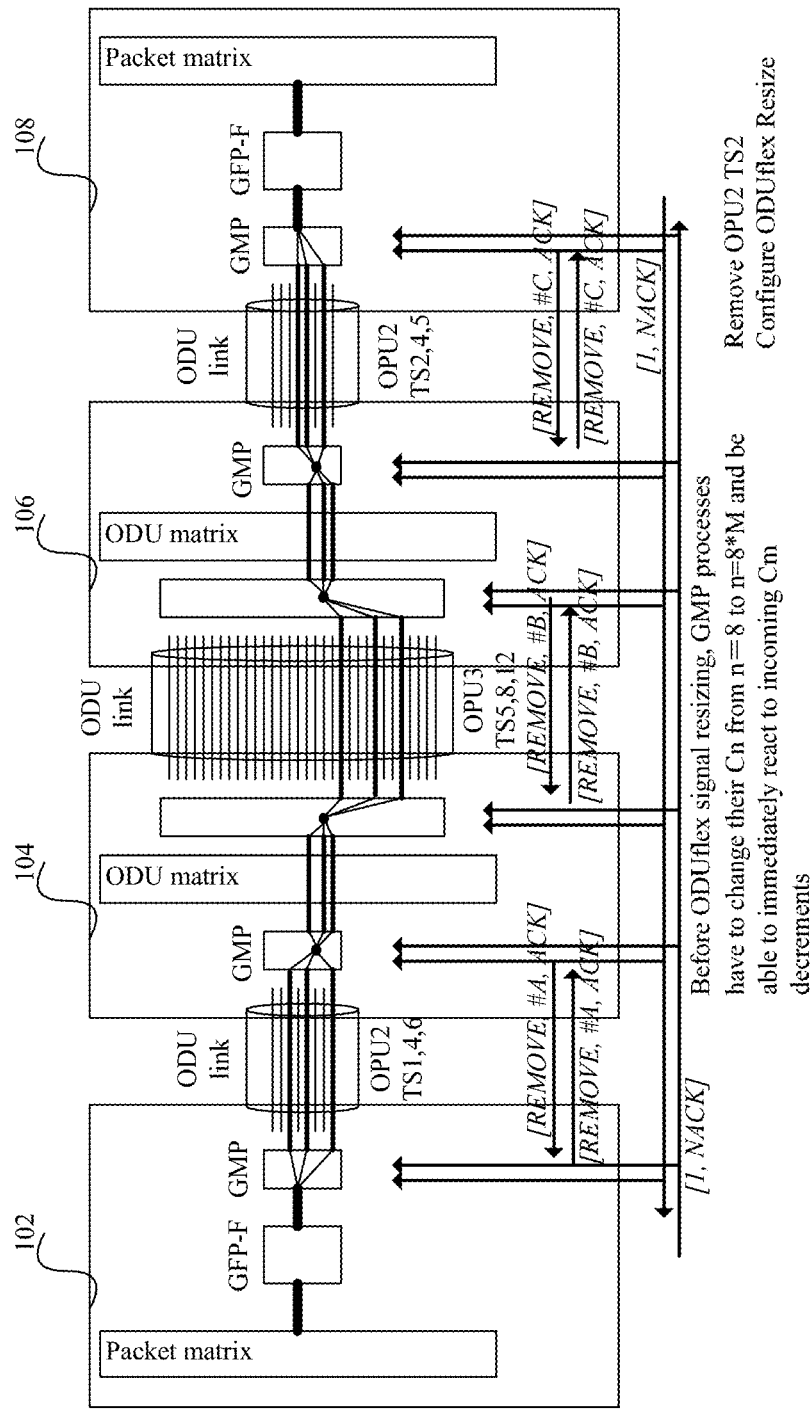
Figure 14E:
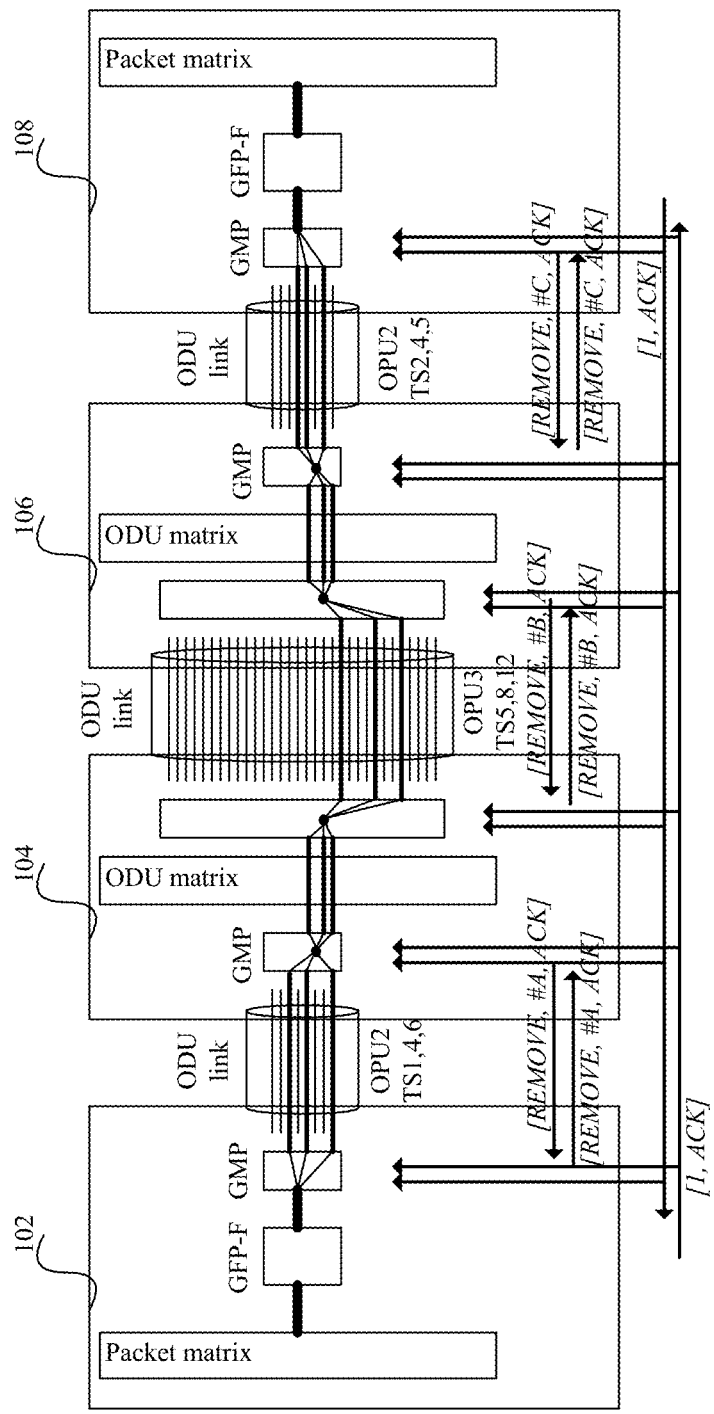
Figure 14F:
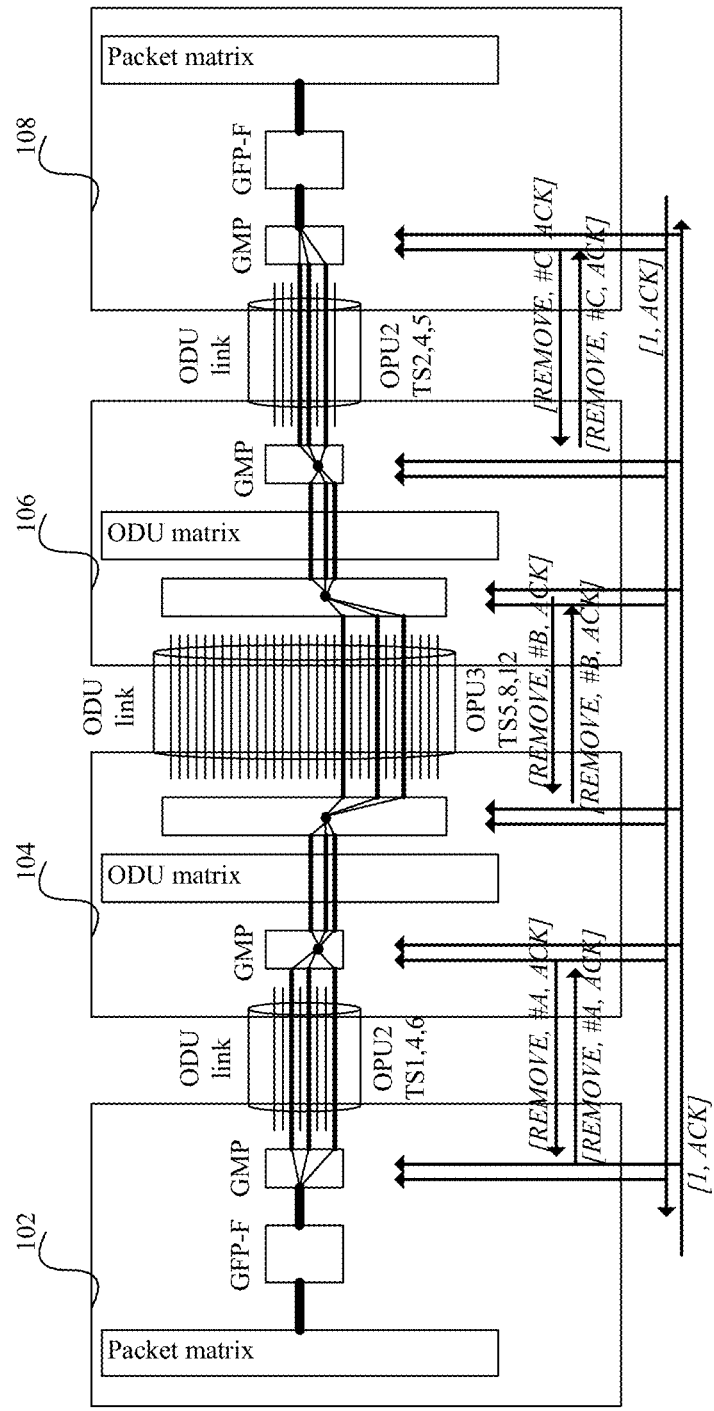
Figure 14G:
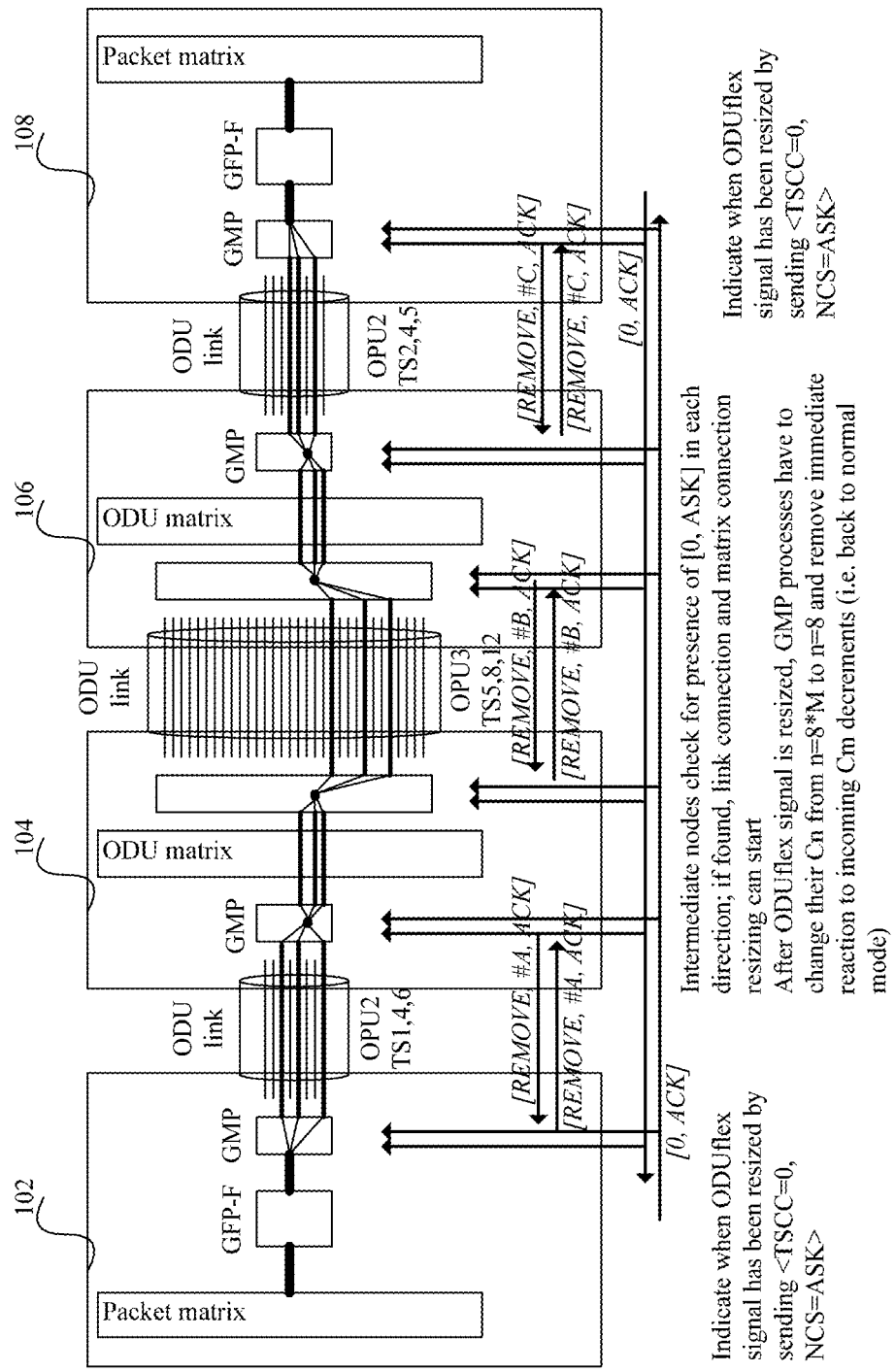
Figure 14H:
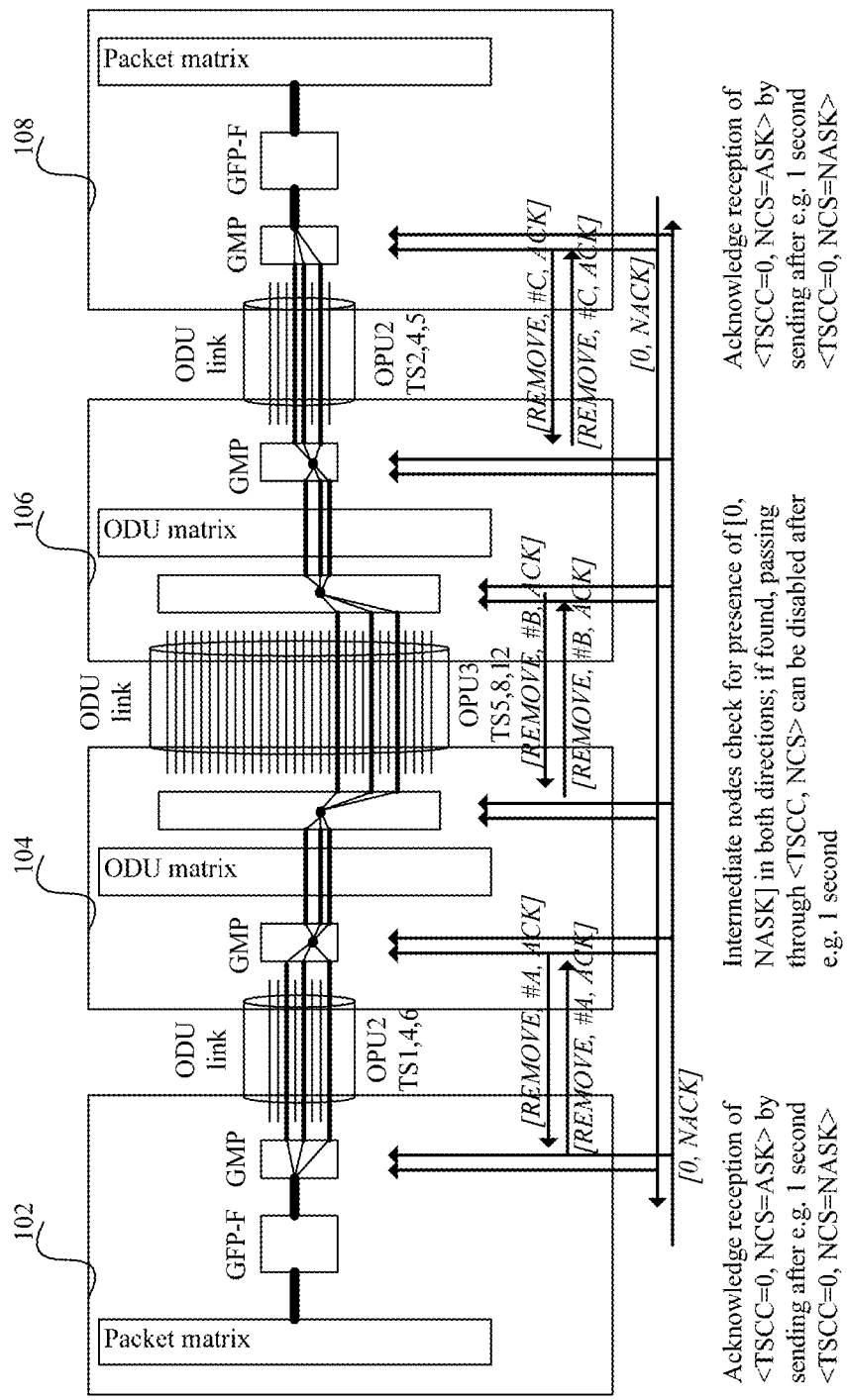

According to FIG. 14d, the egress end node 108 is configured to decrease the ODTU2.3 and also the ODUflex (GFP)/3. The status in FIG. 14e is that the resizing $C_n/C_m$ mode is entered. FIG. 14f illustrates that the ODUflex (GFP)/3 is decremented to ODUflex (GFP)/2. In FIG. 14g, the completion of the ODUflex (GFP) resizing is indicated and the normal $C_n/C_m$ mode is entered. In FIG. 14h, the completion of the ODUflex (GFP) resizing is acknowledged.

Figure 14I:
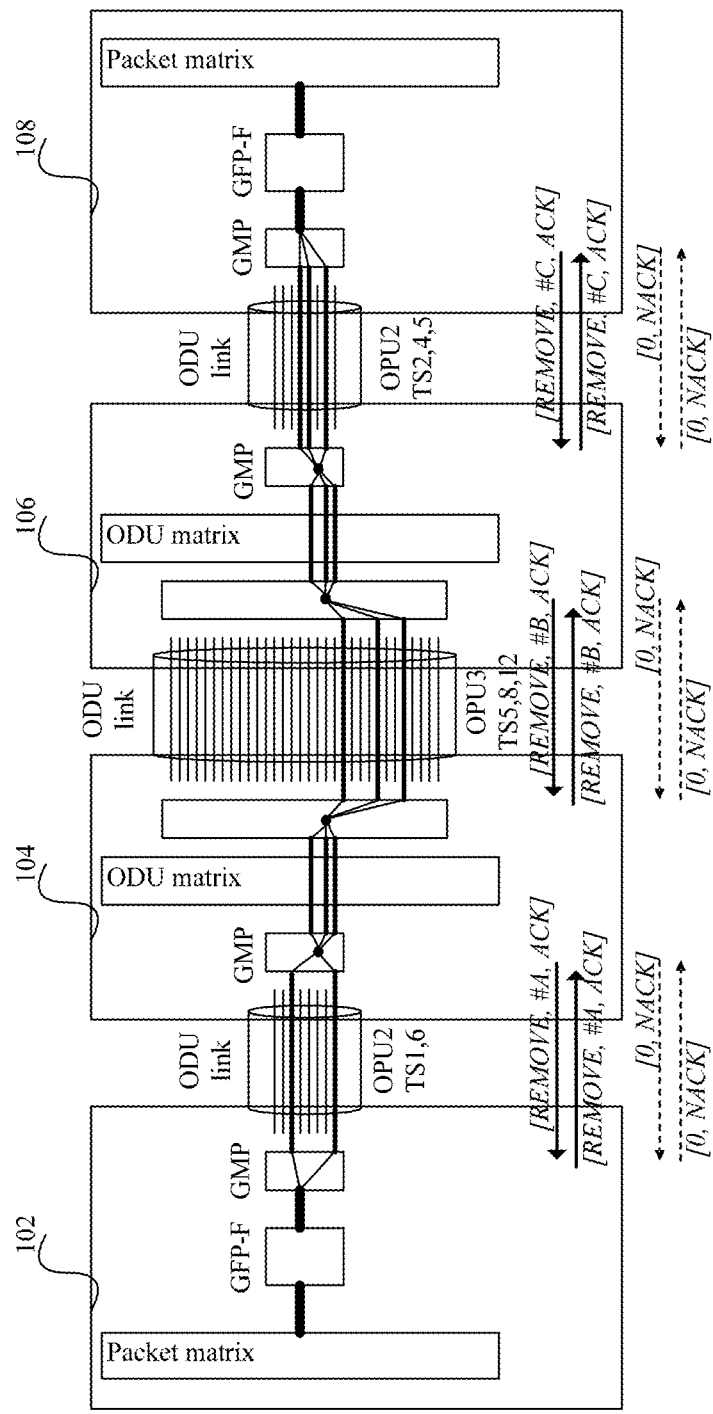
Figure 14J:
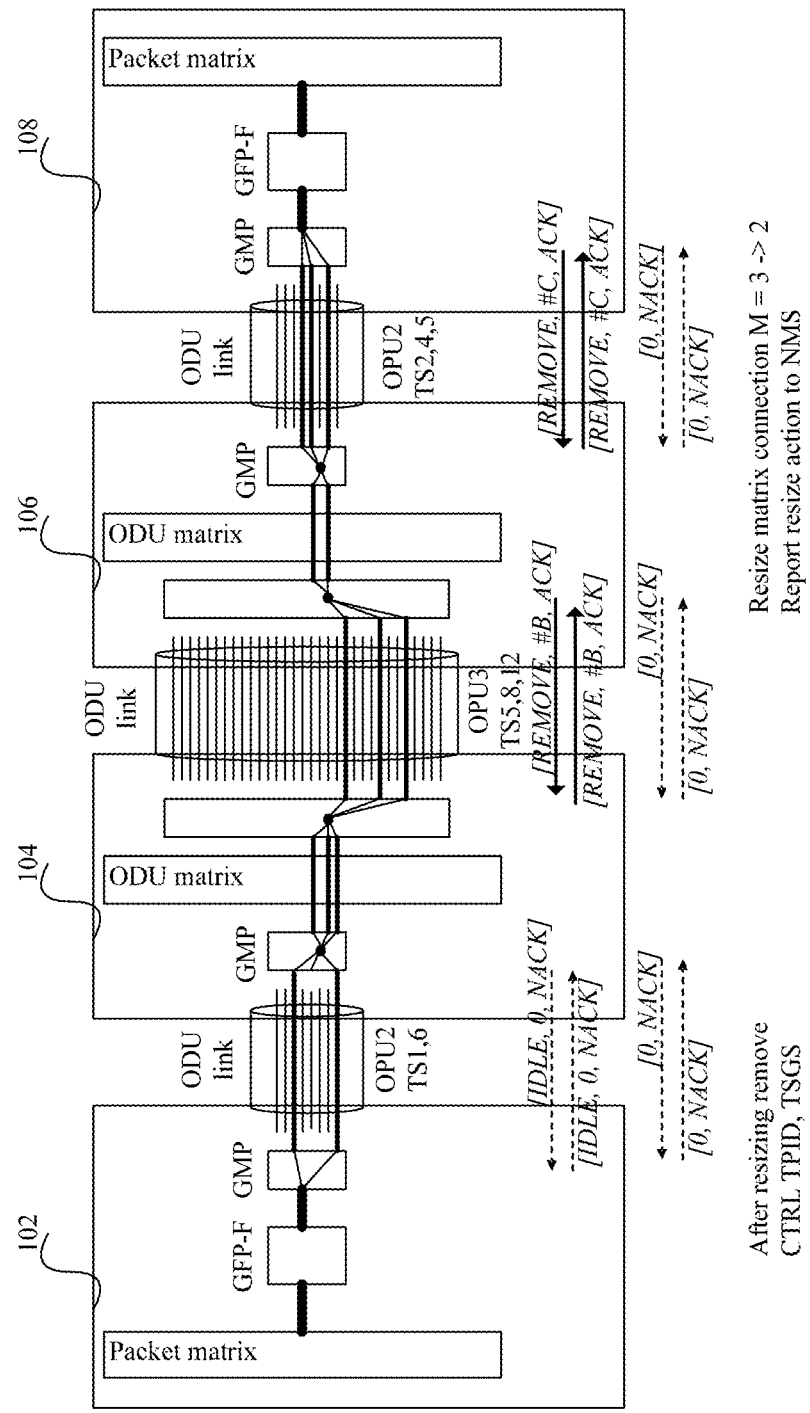
Figure 14K:
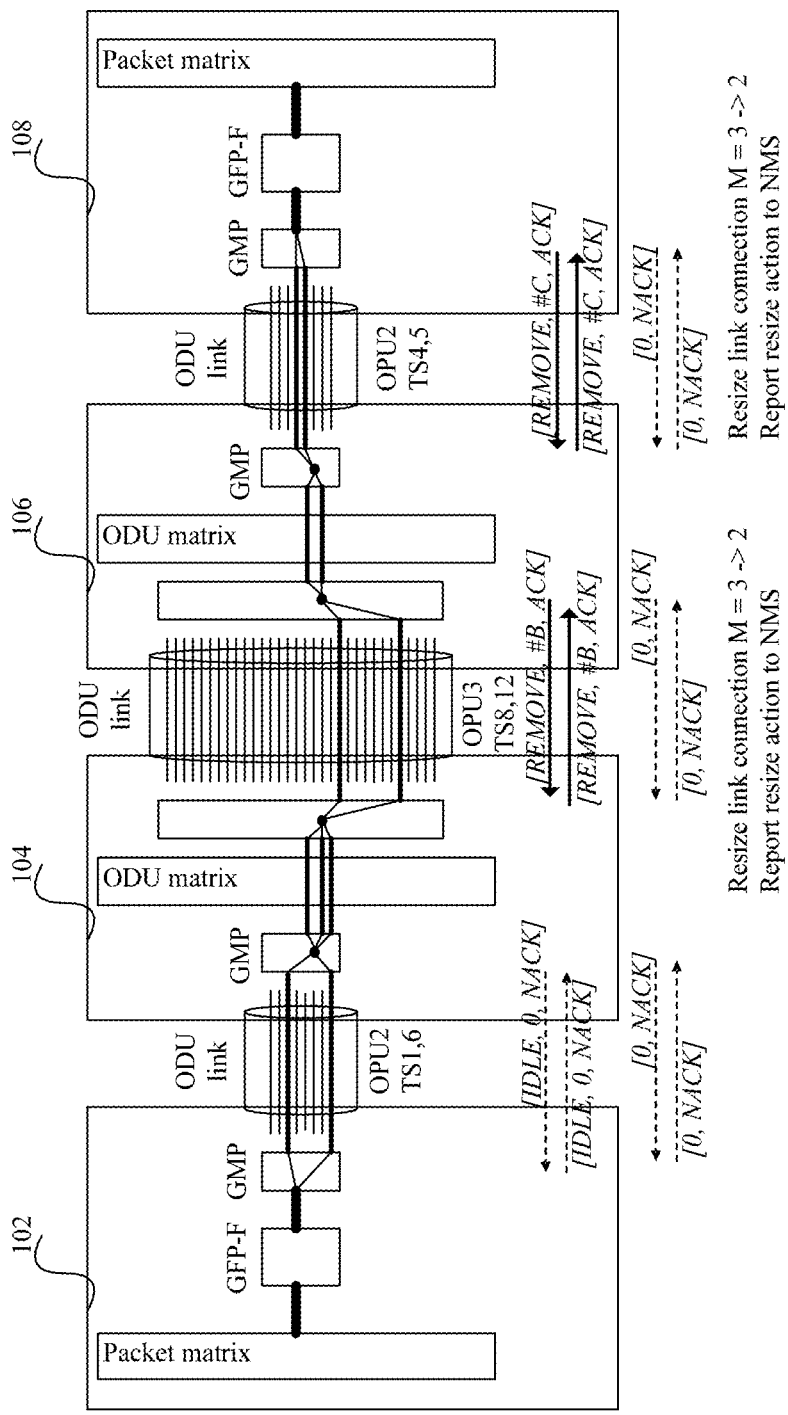
Figure 141:
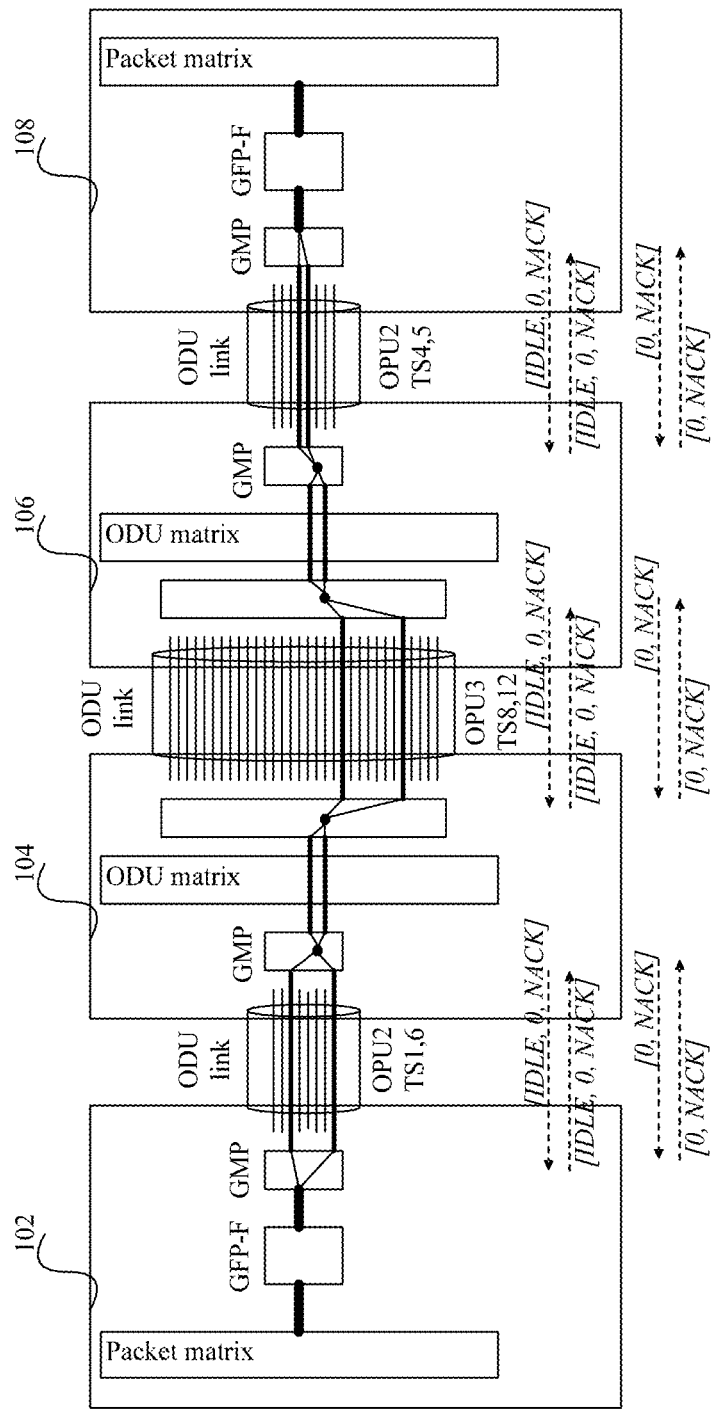
Figure 14M:
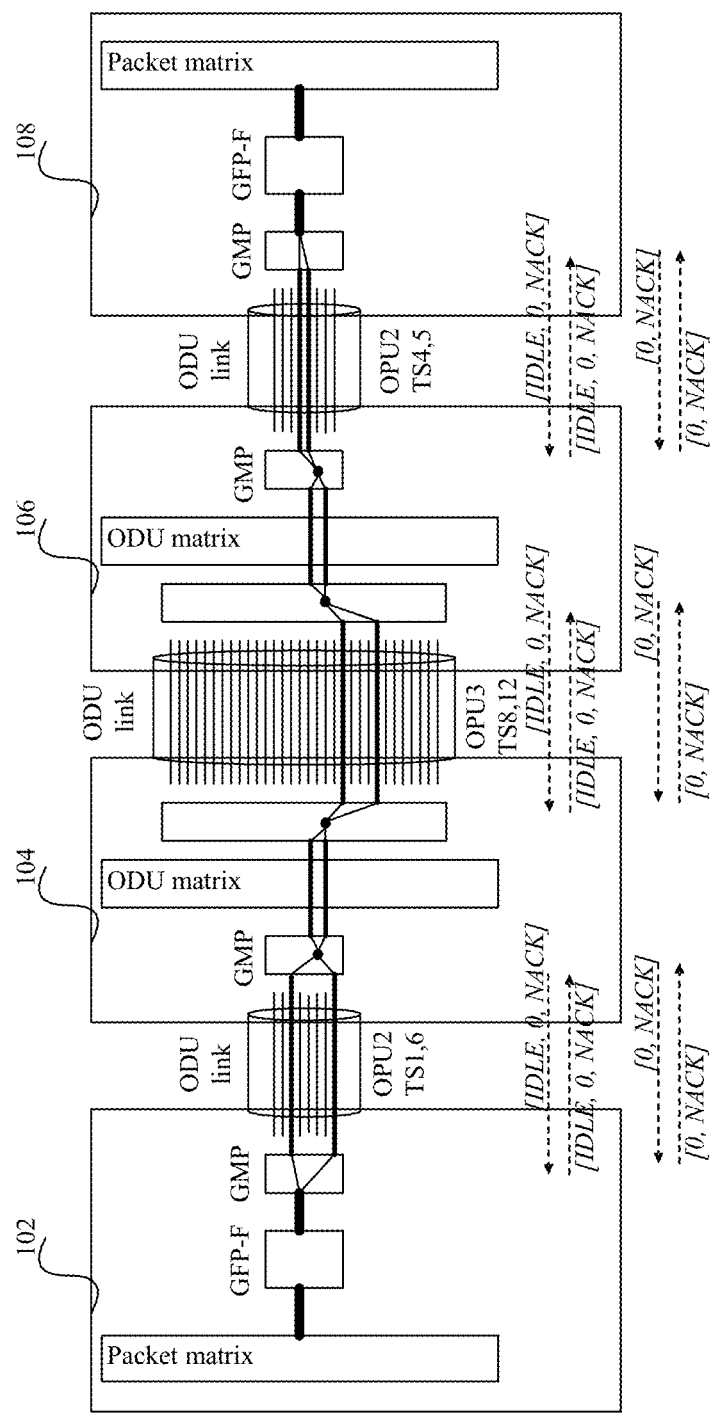

According to FIG. 14*i*, the passing through of the resize control overhead is disabled. The link between nodes 102 and 104 is decremented. In FIG. 14*j*, the matrix connection in node 106 is decremented. The resize connection control goes back to default on the link 110 between nodes 102 and 104. FIG. 14*k* illustrates that the link (sub)connections between nodes 104 and 106, and between nodes 106 and 108 are decremented. In FIG. 14*l*, the matrix connection in node 104 is decremented, the resize connection control overhead goes back to default on the links 112 and 114 between nodes 104 and 106, and nodes 106 and 108, respectively. FIG. 14*m* shows that the decrementing procedure is completed with ODUflex (GFP)/2 being supported by ODTU2.2, ODTU3.2 and ODTU2.2 on links 110, 112 and 114, respectively.

The techniques proposed herein enable a hitless resizing of network connections in data transport networks with less complexity than compared to the prior art such as VCAT/LCAS, for example. For resizing, the VCAT/LCAS technique comprises only adding or removing end-to-end links, i.e. a distribution/collection function is realized only at the end nodes of a connection, while according to the techniques proposed here, multiple CDP functions are provided along the network connection, one in each end node and two in each intermediate node.

The proposed techniques require in-band signaling only which might use currently unused tributary slot overhead in case of ODUflex, i.e. no additional signaling protocol needs to be implemented. The signaling is also less complex than in the LCAS case. For example, there is no need to send back a status of each ODUflex slot back to the source.

Further, a minimum management overhead only is required, e.g. for allocating spare tributary slots in case of incrementing a network connection. Thus, there is much less associated state required in a network management plane then in ODUk VCAT/LCAS case. While the virtual concatenation according to VCAT/LCAS requires the use of delay compensating buffers at the egress end point of the network connection, there is no need for such buffer according to the techniques proposed herein.

In the following examples for controlling dynamic hitless resizing of a network connection in a data transport network are provided:

Example 1: a method for controlling dynamic hitless resizing of a network connection in a data transport network, herein a path of the network connection extends between two connection end nodes and optionally over one or more intermediate nodes of the data transport network;
wherein the network connection transports data of client services in transport frames from the ingress end node to the egress end node; and
wherein the network connection comprises a first set of M tributary slots defined in a payload area of a higher order transport scheme of the data transport network;
the method comprising the following steps,
in case the network connection is to be incremented:
  receiving a connection resize control signal at each of the nodes along the path of the network connection;
  adding at each node along the path in response to the connection resize control signal a second set of N tributary slots to the first set of the M tributary slots, such that the network connection comprises M+N tributary slots; and
  increasing, after M+N tributary slots are available for the network connection at each node along the path in a synchronized manner between each pair of neighbouring nodes, a transport data rate of the network connection; and
in case the network connection is to be decremented:
  receiving a connection resize control signal at each of the nodes along the path of the network connection;
  decreasing, after a second set of N tributary slots has been prepared for removal at each node along the path of the network connection in a synchronized manner between each pair of neighbouring nodes, a transport data rate of the signal passing though the network connection; and
  removing at each node along the path in response to the connection resize control signal a second set of N tributary slots from the first set of the M tributary slots, such that the network connection comprises M−N tributary slots.

An implementation of the method according to Example 1:
Wherein the network connection comprises a set of link connections between each pair of neighbouring nodes along the path, and comprises matrix through-connections in each intermediate node in the path, a matrix internally interconnecting multiple links of the intermediate node with other nodes in the data transport network, link connections and matrix through-connections being defined based on the tributary slots,
wherein each node along the path of the network connection comprises at least on collection/distribution point for either collecting the client data from a set of link connections and distributing the client data to a set of matrix through-connections or for collecting the client data from a set of matrix through-connections and distributing the client data to a set of link connections; and
wherein, in case the network connection is to be incremented, the step of adding the N tributary slots comprises, at the collection/distribution point,
  adding the N tributary slots to the M link connections, and
  adding the N tributary slots to the M matrix through-collections; and
wherein, in case the network connection is to be decremented, the step of removing the N tributary slots comprises, at the collection/distribution point,
  removing the N tributary slots from the M link connections, and
  removing the N tributary slots from the M matrix through-connections.

An implementation of the method according to Example 1, the method further comprises steps of:
  sending, by the ingress end node, a data rate control signal hop-by-hop along the path of the network connection, wherein the data rate control signal is discarded by a node which has not finished the step of adding or marking for removal, respectively, the N tributary slots;
  sending, by the egress end node in response to a reception of the data rate control signal, an acknowledgement to the ingress end node; and
  increasing, in case the network connection is to be incremented, by the ingress end node, in response to the reception of the acknowledgement the data rate of the signal passing through the network connection; or,
  in case the network connection is to be decremented, decreasing the data rate of the signal passing through the network connection and then removing the N tributary slots from the M tributary slots at each node along the path.

An implementation of the method according to Example 1: wherein the step of adding or removing, respectively, the second set of N tributary slots to or from the first set of the M tributary slots in an intermediate node comprises adding or removing, respectively, the N tributary slots to or from the M tributary slots with respect to at least one of a link connection and a matrix through-connection; and re-grouping, in case M tributary slots are assigned to the link connection and M+N tributary slots are assigned to the matrix through-connection, or in case M+N tributary slots are assigned to the link connection and M tributary slots are assigned to the matrix through-connection, the data to be transported over the network connection from M data groups into M+N data groups or from M+N data groups into M data groups, or re-grouping, in case M tributary slots are assigned to the link connection and M−N tributary slots are assigned to the matrix through-connection, or in case M−N tributary slots are assigned to the link connection and M tributary slots are assigned to the matrix through-connection, the data to be transported over the network connection from M data groups into M−N data groups or from M−N data groups into M data groups.

An implementation of the method according to Example 1: wherein the step of adding the N tributary slots to the M tributary slots in a node comprises decreasing a number of data units per transport frame for the M tributary slots by a factor of M/(M+N), or alternatively the step of removing the N tributary slots from the M tributary slots in the node comprises increasing a number of data units per transport frame for the M tributary slots by a factor of M/(M−N).

A number of data units per transport frame for the N tributary slots is kept unchanged.

In the step of increasing or decreasing, respectively, the transport data rate of the network connection, a number of data units per transport frame is increased or decreased, respectively, collectively for the M tributary slots and the N tributary slots.

An implementation of the method according to Example 1: wherein the connection resize control signal is sent by network management in arbitrary order to each of the nodes along the path of the network connection, and wherein the step of adding or removing, respectively, the N tributary slots to or from the M tributary slots is performed in each of the nodes along the network connection path independently.

An implementation of the method according to Example 1, for the case that the N tributary slots are to be added to the M tributary slots, the method further comprises steps of:
  checking an availability of N tributary slots in each of the nodes along the path of the network connection; and
  allocating available N tributary slots in the nodes along the path for the network connection.

The connection resize control signal and the data rate control signal are transported in an overhead portion of at least one of the second set of the N tributary slots.

An implementation of the method according to Example 1: wherein the data transport network comprises an optical transport network and in particular the network connection is an Optical Channel Data Unit "ODU" connection with selectable bandwidth, in particular an ODUfl ex connection.

While the current invention has been described in relation to its preferred embodiments, it is to be understood that this description is for illustrative purposes only. Accordingly, it is intended that the invention be limited only by the scope of the claims appended hereto.

What is claimed is:

1. A method for controlling dynamic hitless resizing of an Optical Data Unit flex (ODUflex) network connection in an Optical Transport Network (OTN) wherein (a) a path of the ODUflex network connection extends between two connection end nodes and over one or more intermediate nodes, (b) the ODUflex network connection transports data of client services in transport frames from an ingress end node to an egress end node and (c) the ODUflex network connection comprises a set of M tributary slots, the method comprising:
  receiving a connection resize control signal;
  adding a set of N tributary slots to the set of the M tributary slots; and
  increasing a bandwidth of the ODUflex network connection after M+N tributary slots are available for the ODUflex network connection at each node along the path of the ODUflex network connection in a manner that is synchronized with a downstream node by passing a tributary slot connectivity check (TSCC) signal, wherein M and N are positive integers.

2. The method according to claim 1, further comprising:
  initiating sending of a data rate control signal hop-by-hop along the path of the ODUflex network connection, wherein the data rate control signal is discarded by a node which has not finished the adding the N tributary slots or marking for removal of the N tributary slots; and
  receiving an acknowledgement to the data rate control signal from the egress end node.

3. A method for controlling dynamic hitless resizing of an Optical Data Unit flex (ODUflex) network connection in an Optical Transport Network (OTN) wherein (a) a path of the ODUflex network connection extends between two connection end nodes and over one or more intermediate nodes of the OTN, (b) the ODUflex network connection transports data of client services in transport frames from an ingress end node to an egress end node and (c) the ODUflex network connection comprises a set of M tributary slots, the method performed by an intermediate node and comprising:
  receiving a connection resize control signal;
  adding or removing, in response to the connection resize control signal, a set of N tributary slots to or from the set of the M tributary slots, such that the ODUflex network connection comprises M+N tributary slots or M−N tributary slots; wherein M and N are positive integers;
  receiving a data rate control signal from the node upstream the ODUflex network connection path; and
  sending an acknowledgement to the ingress end node in response to the reception of the data rate control signal.

4. The method according to claim 3, wherein
  (a) the ODUflex network connection comprises a set of link connections between each pair of neighboring nodes along the path, and matrix through-connections in each intermediate node in the path,
  (b) a matrix internally interconnects multiple link connections of the intermediate node with other nodes in the OTN,
  (c) the multiple link connections and the matrix through-connections are defined based on tributary slots,
  (d) the intermediate node comprises a first collection/distribution point for collecting client data from a set of link connections terminating from an upstream node and distributing the client data to a set of matrix through-connections and a second collection/distribution point for collecting the client data from the set of matrix through-connections and distributing the client data to a set of link connections starting towards a downstream node, (e) in case the ODUflex network connection is to be incremented, adding the N tributary slots comprises at each of collection/distribution points,
adding the N tributary slots to M link connections, and
adding the N tributary slots to M matrix through-collections; and
(f) in case the ODUflex network connection is to be decremented, removing the N tributary slots comprises at each of the collection/distribution points,
removing the N tributary slots from the M link connections, and
removing the N tributary slots from the M matrix through-connections.

5. The method according to claim 3, further comprising:
receiving a data rate control signal from a node upstream or downstream the ODUflex network connection path; and
discarding the data rate control signal in case the adding or marking for removal of the N tributary slots is not finished.

6. The method according to claim 3, further comprising:
receiving a data rate control signal from a node upstream or downstream the ODUflex network connection path; and
forwarding the data rate control signal to a next node along the ODUflex network connection path.

7. The method according to claim 3, wherein the adding or removing the N tributary slots to or from the M tributary slots comprises:
adding or removing, respectively, the N tributary slots to or from the M tributary slots with respect to either a link connection or a matrix through-connection, wherein the link connection connects the intermediate node with another node along the path of the network connection, the matrix internally interconnects multiple link connections of the intermediate node with other nodes in the OTN; and
re-grouping, in case the M tributary slots are assigned to the link connection and M−N tributary slots are assigned to the matrix through-connection, or in case M−N tributary slots are assigned to the link connection and the M tributary slots are assigned to the matrix through-connection, data to be transported over the ODUflex network connection from M data groups into M−N data groups or from M−N data groups into M data groups.

8. The method according to claim 3, wherein the adding or removing the N tributary slots to or from the M tributary slots comprises:
adding or removing, respectively, the N tributary slots to or from the M tributary slots with respect to either a link connection or a matrix through-connection, wherein the link connection connects the intermediate node with another node along the path of the network connection, the matrix internally interconnects multiple link connections of the intermediate node with other nodes in the OTN; and
re-grouping, in case the M tributary slots are assigned to the link connection and M+N tributary slots are assigned to the matrix through-connection, or in case M+N tributary slots are assigned to the link connection and the M tributary slots are assigned to the matrix through-connection, data to be transported over the ODUflex network connection from M data groups into M+N data groups or from M+N data groups into M data groups.

9. A method for controlling dynamic hitless resizing of an Optical Data Unit flex (ODUflex) network connection in an Optical Transport Network (OTN), wherein (a) the ODUflex network connection comprises a set of M tributary slots, (b) a path of the ODUflex network connection extends between two connection end nodes and over one or more intermediate nodes, and (c) the ODUflex network connection transports data of client services in transport frames from an ingress end node to an egress end node, the method comprising:
receiving a connection resize control signal at each of nodes along the path of the ODUflex network connection;
decreasing a transport data rate of signal passing though the ODUflex network connection; and
removing at each node along the path in response to the connection resize control signal a set of N tributary slots from the set of the M tributary slots, such that the ODUflex network connection comprises M−N tributary slots; wherein M and N are positive integers.

10. The method according to claim 9, further comprising:
receiving the connection resize control signal;
decreasing, after another set of N tributary slots has been prepared for removal in a synchronized manner between the ingress end node and a neighboring node by passing a tributary slot connectivity check (TSCC) signal, a bandwidth of the ODUflex network connection; and
removing the another set of N tributary slots from the set of the M tributary slots.

11. A network node for controlling dynamic hitless resizing of an Optical Data Unit flex (ODUflex) network connection in an Optical Transport Network (OTN), wherein (a) the ODUflex network connection comprises a set of M tributary slots, (b) a path of the ODUflex network connection extends between two connection end nodes and over one or more intermediate nodes, and (c) the ODUflex network connection transports data of client services in transport frames from an ingress end node to an egress end node, the network node comprising:
a receiver configured to receive a connection resize control signal CTRL ADD; and
a processor configured to
a) add a set of N tributary slots to the set of the M tributary slots; and
b) increase a bandwidth of the ODUflex network connection after M+N tributary slots are available for the ODUflex network connection at each node along the path of the ODUflex network connection in a manner synchronized with a downstream node by passing a tributary slot connectivity check TSCC signal, wherein M and N are positive integers.

12. The network node according to claim 11, further comprising:
a component configured to receives a connection resize control signal CTRL REMOVE;
a component configured to decrease a bandwidth of the ODUflex network connection, after the set of N tributary slots has been prepared for removal at each node along a path of the ODUflex network connection in a synchronized manner between each pair of neighboring nodes by passing a tributary slot connectivity check (TSCC) signal; and
a component configured to remove the set of N tributary slots from the set of the M tributary slots.

13. The network node according to claim 11, further comprising:

a component configured to initiate sending of a data rate control signal hop-by-hop along a path of the ODUflex network connection, wherein the data rate control signal is discarded by a node which has not finished adding or marking for removal of the set of N tributary slots; and a component configured to receive an acknowledgement of the data rate control signal sent from the egress end node.

\* \* \* \* \*